(12) United States Patent
Wengrovitz

(10) Patent No.: US 7,804,949 B2
(45) Date of Patent: Sep. 28, 2010

(54) CLIENT-BASED INTEGRATION OF PBX AND MESSAGING SYSTEMS

(75) Inventor: Michael S. Wengrovitz, Concord, MA (US)

(73) Assignee: Alcatel Lucent, Paris (FR)

( * ) Notice: Subject to any disclaimer, the term of this patent is extended or adjusted under 35 U.S.C. 154(b) by 1400 days.

(21) Appl. No.: 10/750,795

(22) Filed: Dec. 31, 2003

(65) Prior Publication Data
US 2005/0141688 A1 Jun. 30, 2005

(51) Int. Cl.
*H04M 3/42* (2006.01)
(52) U.S. Cl. .............................. 379/207.04; 379/201.1; 379/207.05; 379/207.07; 379/211.02; 379/212.01
(58) Field of Classification Search ............ 379/207.04, 379/93.01, 265.02, 265.09, 265.01, 221.11, 379/207.05, 207.07, 207.06, 212.01, 211.02, 379/215.01, 201.1; 709/219
See application file for complete search history.

(56) References Cited

U.S. PATENT DOCUMENTS

| | | | |
|---|---|---|---|
| 6,560,329 B1 * | 5/2003 | Draginich et al. ...... | 379/265.02 |
| 7,046,789 B1 * | 5/2006 | Anderson et al. ...... | 379/265.01 |
| 7,200,218 B1 * | 4/2007 | Lindley et al. ......... | 379/221.11 |
| 7,233,980 B1 * | 6/2007 | Holden et al. ................ | 709/219 |
| 7,263,183 B1 * | 8/2007 | Klein et al. ............. | 379/265.09 |
| 7,295,669 B1 * | 11/2007 | Denton et al. .......... | 379/265.02 |
| 2003/0210777 A1 * | 11/2003 | Fromm ................... | 379/265.02 |
| 2004/0001580 A1 * | 1/2004 | Mason ................... | 379/207.04 |
| 2004/0028197 A1 * | 2/2004 | Gray et al. ............... | 379/93.01 |

* cited by examiner

*Primary Examiner*—Thjuan K Addy
(74) *Attorney, Agent, or Firm*—Galasso & Associates, LP

(57) ABSTRACT

This invention integrates instant messaging, presence, and other collaborative capabilities with conventional PBX functionality through use of a PBX-Messaging Integration Client (PMIC). The invention in its several embodiments features a method and system for using the PMIC-based computer interface to perform off-hook/on-hook presence notification for a PBX phone, establish media sessions concurrent with PBX telephonic communication, execute custom call treatment in conjunction with a PBX phone, implement call transfer capability between a PBX phone and numerous other devices, and provide PBX call control. The PBX is generally enabled with computer telephony integration (CTI) and, depending on the embodiment, a Voice-over-Internet Protocol (VoIP) such as Session Initiation Protocol (SIP). The invention empowers enterprise workers with a diverse, unified and integrated set of both PBX functions and SIP-based collaboration tools.

50 Claims, 24 Drawing Sheets

CLIENT-BASED INTEGRATION OF PBX AND MESSAGING SYSTEMS

FIELD OF THE INVENTION

The present invention relates to a technique for integrating one or more user interfaces with a PBX phone system. In particular, the invention relates to a method and system for providing off-hook/on-hook presence notification for a PBX phone, establishing media sessions concurrent with PBX telephonic communication, customized call treatment for a PBX phone, call transfer capability between a PBX phone and numerous other devices, and PBX call control.

BACKGROUND

Private Branch Exchange (PBX) telephone systems are used in many businesses to enable workers to make and receive calls from the Public Switched Telephone Network (PSTN) and other PBX phones within the enterprise. PBX systems also provide a host of telephonic services to the enterprise workers including call forwarding, transferring, conferencing, voice mail, personalized greetings, and the like.

In many cases, an enterprise worker's phone resides on the desktop in immediate proximity to the worker's personal computer. The personal computer may provide tools for word processing, viewgraph editing, email, and web browsing, as well as other communications tools such as instant messaging, buddy lists, presence, video, and other tools for collaboration. Instant messaging allows people with network access to send text messages and other media to other individuals listed in a buddy or contact list. An instant text message is sent in near-real time to a contact where it is then displayed in a graphical user interface window within the context of an on-going text-based conversation. In addition to text messages, instant messaging may also be used within chat sessions and custom chat rooms where friends or co-workers can interact and share media. Some instant messaging applications are also enabled with a presence protocol used by a one person to determine whether a buddy or contact is "present" online and to subscribe to changes in the presence state or information.

Despite the prevalence of PBX phones and communications-enabled personal computers in the enterprise, there is an absence of sufficient integration between these two types of communication systems. For example, an enterprise worker's instant messaging application may be aware of the worker's online presence but is oblivious to the worker's telephonic presence, i.e. buddies do not know that a worker is occupied on his PBX phone. Or, as a second example, although a worker sets up a voice session to another worker by dialing a PBX extension, an entirely separate process must be followed to setup a session for exchanging a document. Therefore, there is a need for a solution that integrates the PBX system and communications applications on enterprise workers' computers to provide greater interoperability, simplified PBX control, and enhanced sharing and collaboration.

SUMMARY

The invention in its several embodiments features a method and system for using a computer interface to perform off-hook/on-hook presence notification for a PBX phone, establish media sessions concurrent with PBX telephonic communication, execute custom call treatment in conjunction with a PBX phone, implement call transfer capability between a PBX phone and numerous other devices, and provide PBX call control. The PBX is generally enabled with computer telephony integration (CTI) capabilities and may also, depending on the embodiment, be enabled with Voice-over-Internet Protocol (VoIP) capabilities such as Session Initiation Protocol (SIP). The computer interface may be any number of computer appliances including personal computer also enabled with CTI, for example.

In one embodiment, the invention relates to a presence notification method for communicating an enterprise worker's on-phone/off-phone presence state to other workers using a computer interface operatively coupled to a system comprising a private branch exchange (PBX) and a first PBX phone. The presence notification method preferably comprises the steps of: receiving from the PBX a first message indicating an off-hook state of the first PBX phone; consulting a subscriber table including the identity of one or more presence-state subscribers; and transmitting a second message to at least one of the one or more presence-state subscribers indicating the off-hook state of the first PBX phone.

In a second embodiment, the invention relates to a method for establishing a collateral communication session between a plurality of enterprise workers' computer interfaces in response to a call between the workers. The collateral communication session, referred to herein as a concurrent media session, may take a number of forms including text messaging, document exchange, desktop sharing, and video, for example. The method for establishing concurrent media session setup using a first computer interface operatively coupled to a system comprising a private branch exchange (PBX) and a second computer interface preferably comprises the steps of: receiving from the PBX a first message signifying that the second PBX phone has called the first PBX phone; transmitting a second message from the first computer interface to the second computer interface requesting a media session; determining whether the media session request has been accepted at the second computer interface; and establishing a media session between the first computer interface and second computer interface if the session request message is accepted.

In a third embodiment, the invention relates to a method for performing custom call treatment allowing a recipient of an incoming PBX call to respond to the call by transferring the call to another device or responding with an instant message, for example, depending on various factors including the caller, the time, and date. The call treatment method in a first computer interface operatively coupled to a system comprising a private branch exchange (PBX) and a first PBX phone preferably comprises the steps of: receiving from the PBX a first message indicating an incoming call; determining from a call routing table maintained by the first computer interface an incoming call response to the incoming call; and transmitting a group of one or more messages based on the incoming call response, wherein the group comprises a second message answering the incoming call.

In a fourth embodiment, the invention relates to a method for transferring a call between an enterprise worker's PBX phone and an associated computer interface. The call transfer method in a first computer operatively coupled to a system comprising a private branch exchange (PBX) and a first PBX phone, preferably comprises the steps of: transmitting to the PBX a first message for transferring a telephone call associated with the first PBX phone; establishing a voice-over-IP session between the PBX and the first computer; and replacing the telephone call to first PBX phone with a call to the first computer via the voice-over-IP session.

In a fifth embodiment, the present invention relates to a method of controlling PBX telephone calls to a worker's PBX phone using a computer interface operatively coupled to a system comprising a PBX and a first PBX phone. The PBX call control method preferably comprises the steps of: receiving from the PBX a first message indicating the presence of a telephone call associated with the first PBX phone; and transmitting to the PBX a call control message, such as a call-hold command, or call-forwarding command directing the PBX to another PBX phone or VoIP client, for example.

BRIEF DESCRIPTION OF THE DRAWINGS

The present invention is illustrated by way of example and not limitation in the figures of the accompanying drawings, and in which.

DETAILED DESCRIPTION

Figure 1:
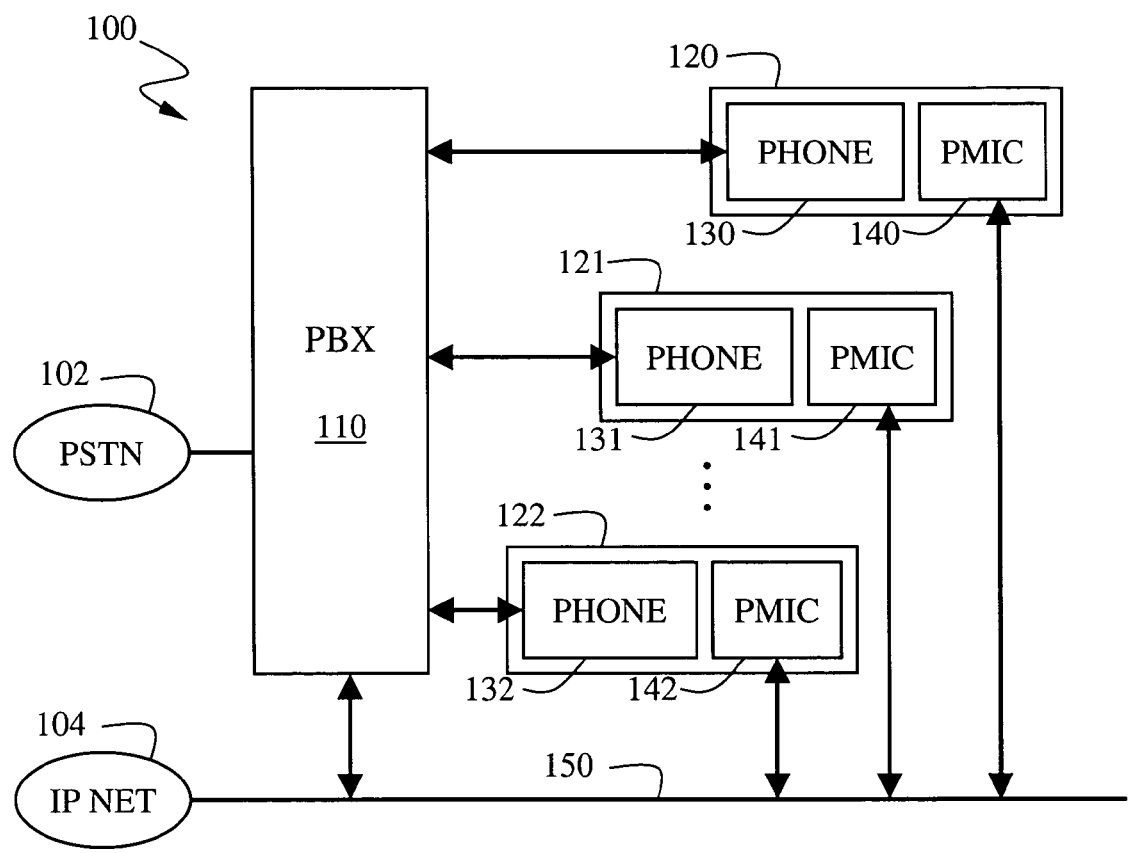
FIG. 1 is a functional block diagram of an enterprise network including a PBX system and Internet Protocol (IP) network, according to the preferred embodiment.

FIG. 1 is a block diagram of a PBX system operably coupled to a data network. The PBX system 100 comprises a PBX 110 and a plurality of PBX phones 130-132, each phone being associated with a unique extension number. The PBX 110 manages calls between the plurality of user phones 131-133 and a set of trunk lines operably coupled to the Public Switch Telephone Network (PSTN) 102 while supporting call forwarding between PBX phones, conference calling, call holding, voice mail, personalized greetings, and the like. The PBX system 100 is consistent with both new telephone systems and a vast number of legacy telephone systems currently located at and operated by enterprises today.

Also operating within the enterprise is a data communications network 150 embodied in or operably coupled to a local area network (LAN), a wide area network (WAN), a metropolitan area network (MAN), the Internet Protocol (IP) network 104, or a combination thereof. The communications network 150 operably couples a plurality of computers enabled with a PBX-Messaging Integration Client (PMIC) 140-142 distributed throughout the enterprise to each other and to the resources available through the World Wide Web using Ethernet and or the transmission control protocol (TCP)/IP protocol suite. Each of the PMICs 140-142 is generally associated with an individual enterprise worker. In most cases, an individual's PMIC is located in the immediate proximity to the individual's phone, thus giving rise to a logical association between a user PMIC and a user phone. The logical association between a PMIC, a phone, and a single user exist for a multiplicity of enterprise workers including a first user 120, second user 121, and third user 122, and so on.

In the preferred embodiment, the PBX 110 is enabled with a computer telephone integration (CTI) protocol, which refers to a signaling convention by which the PMICs 140-142 may control and monitor PBX functions. In the preferred embodiment, the PMICs 140-142 are adapted to act as individualized clients for: (1) placing and answering PBX calls without a PBX phone, (2) routing incoming call directed PBX extensions to other devices, (3) forwarding calls away from PBX phones to other devices, and (4) placing calls on hold. In addition to receiving CTI commands, the PBX or the CTI client associated thereto is also adapted to transmit CTI messages upon occurrence of certain events, as is described in greater detail below. Also in the preferred embodiment, the PMIC provides an interface to presence, instant messaging, document exchange, desktop sharing and other capabilities typically resident in applications such Microsoft's Real-Time Communications (RTC) Messenger.

Figure 2A:
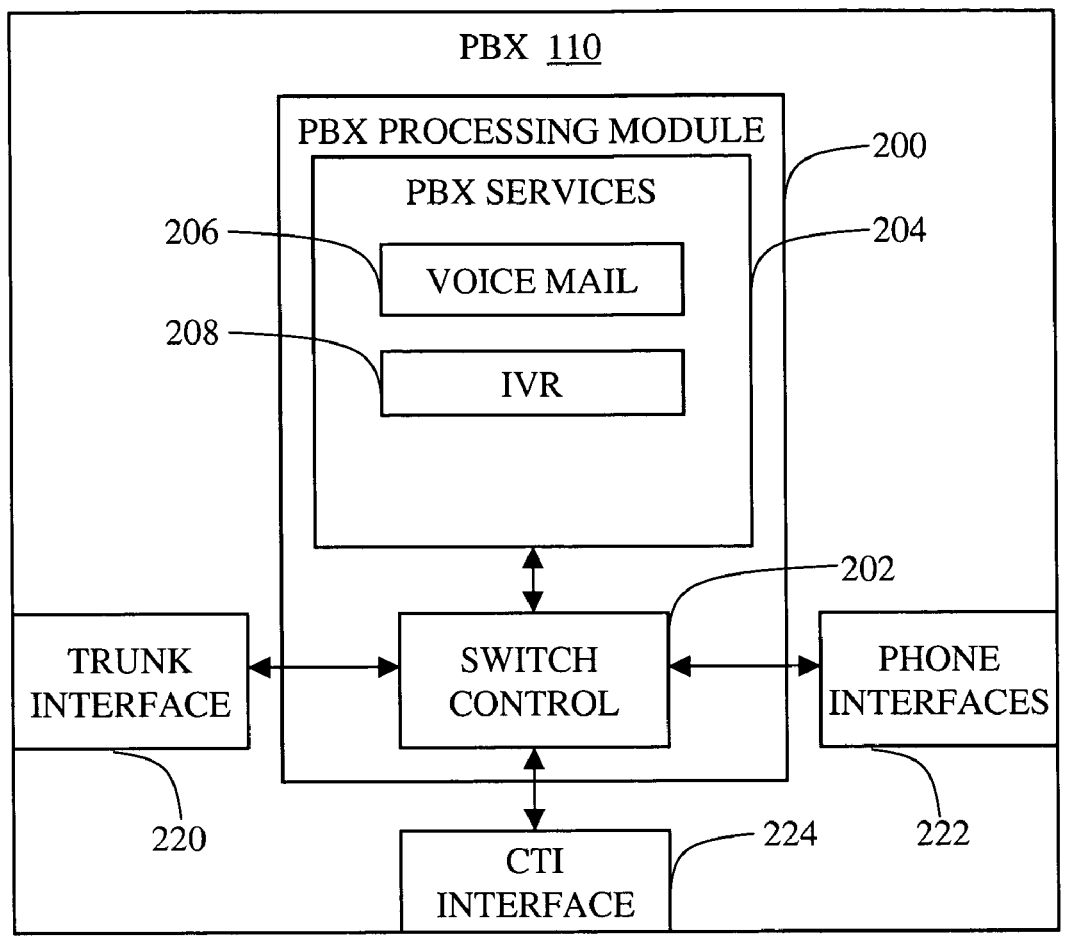
FIG. 2A is a functional block diagram of a PBX, according to the preferred embodiment.

FIG. 2A represents a functional block diagram of the PBX 110 with which the enterprise PMICs 140-142 interoperate. The PBX 110 generally includes a cabinet or backplane including one or more trunk interfaces 220 for converting between the signal format and voice transmission of the PSTN 102 and the internal convention used by the PBX system 100, a plurality of PBX phone interfaces or line cards 222 providing a connection to the user PBX phones 130-132, a CTI interface 224 for transmitting and receiving CTI messages transmitted via the network 150, and a switch controller 202 for creating and managing voice circuits between the trunk interfaces 220, line cards 222, and CTI interface 224. The switch control 202 is generally an element of a processing module 200 embodying various call management services 204 including voice mail 206 and other interactive voice response (IVR) systems 208, for example.

Signaling and voice communications between the PBX 110 and phones 130-132 are conventionally performed using a digital protocol, although an analog protocol may also be employed. The digital protocol, referred to herein a private digital signaling and voice (PDSV) protocol, comprises a signaling convention that includes operation-codes used to exchange voice communications as well control signals. Although well understood by those skilled in the art, PDSV protocols are generally proprietary implementations and differ between vendors. The major CTI standards are Telephony Application Programming interface (TAPI) and Telephony Services Application Programming Interface (TSAPI), as well as the European Communications Manufacturers Association (ECMA) standard for CTI, namely the Computer Supported Telecommunications Applications (CSTA) protocol.

Figure 2B:
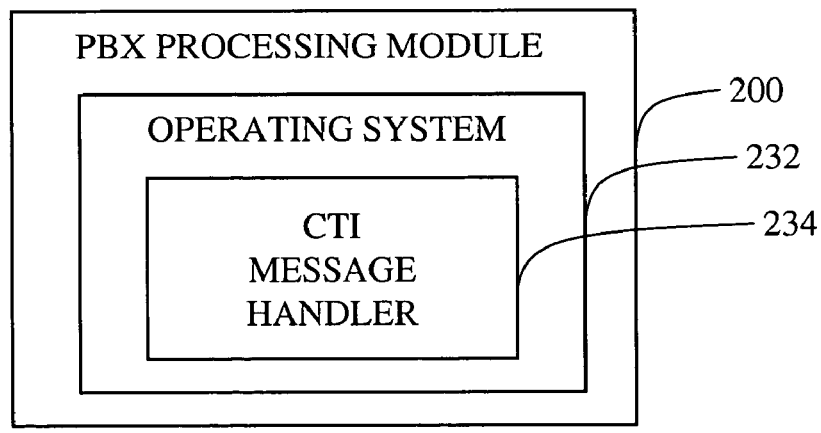
FIG. 2B is a functional block diagram of a PBX processing module, according to the preferred embodiment.

Illustrated in FIG. 2B is a functional block diagram of a PBX processing module 200. The PBX processing module 200 in the preferred embodiment incorporates one or more software and or firmware components that cooperate with switch control 202 to provide the PBX services 204. The PBX processing module 200 may include an operating system 232, e.g. UNIX-based system or proprietary implementation, that in turn supports a CTI message handler 234 adapted to generate and respond to various CTI commands in the manner set forth in greater detail below. When a CTI registration command is used to associate a PBX with a PMIC, for example, the CTI message handler 234 is adapted to transmit various event messages to the PMIC is response to various types of activities involving one or more PBX phones. In particular, the CTI handler 234 in the preferred embodiment is adapted to transmit a CTI off-hook event to a registered PMIC in response to an off-hook signal received from the associated PBX phone, transmit a CTI on-hook event to a registered PMIC in response to an on-hook signal from the associated PBX phone, transmit a incoming-call event to the PMIC associated with a PBX phone to which the PBX transmits a ring signal, a first call-answered event to the PMIC when the associated phone is used to answer an incoming call, and transmit a second call-answered event to the PMIC associated with the PBX phone used to place a call to another PBX phone when it is answered.

Figure 3:
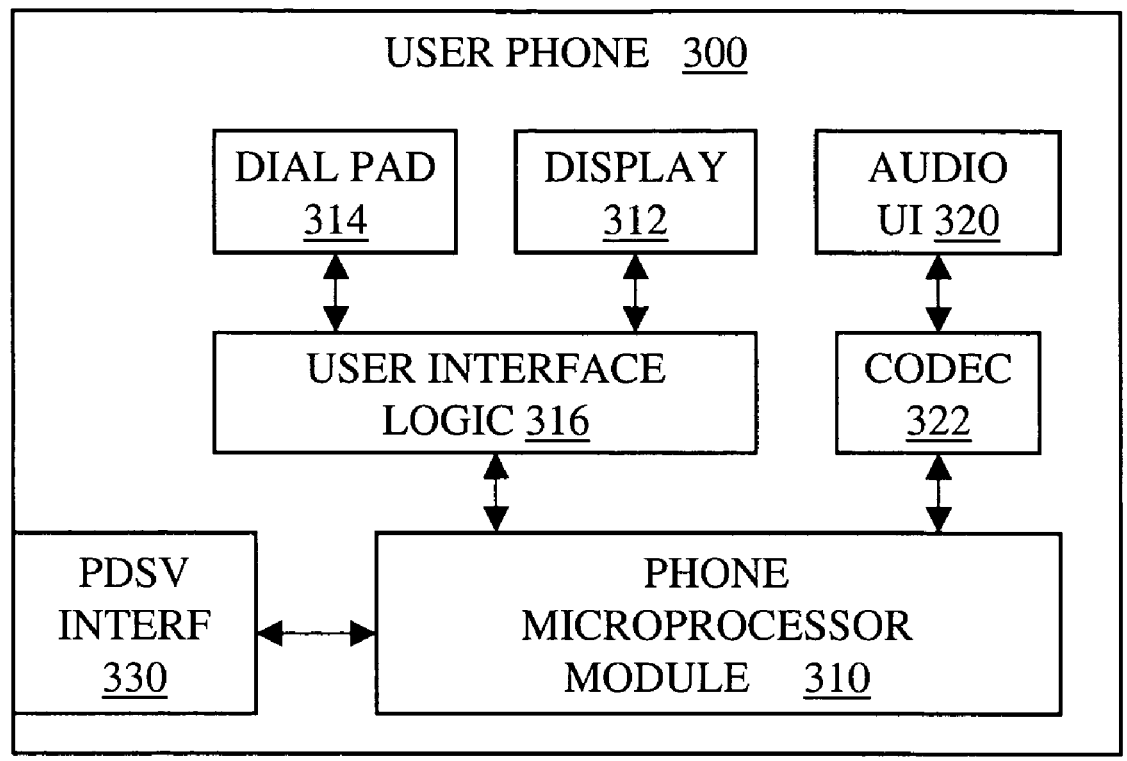
FIG. 3 is a functional block diagram of a PBX user phone, according to the preferred embodiment.

Illustrating in a FIG. 3 is a functional block diagram of a PBX phone typical of user phones 130-132. The user PBX phone preferably includes a handset and base unit 300 comprising a phone microprocessor module 310 that enables incoming and outgoing calls. The phone microprocessor module 310, in combination with the user interface logic 316, transmits input from the dial pad 314 and display relevant information at display 312. The phone microprocessor module 310, in cooperation with coder/decoder 322, conveys incoming voice signals to an audio user interface (AUI) 320 speaker and outgoing voice signals received at an AUI 320 microphone to the PDSV interface 330.

Figure 4A:
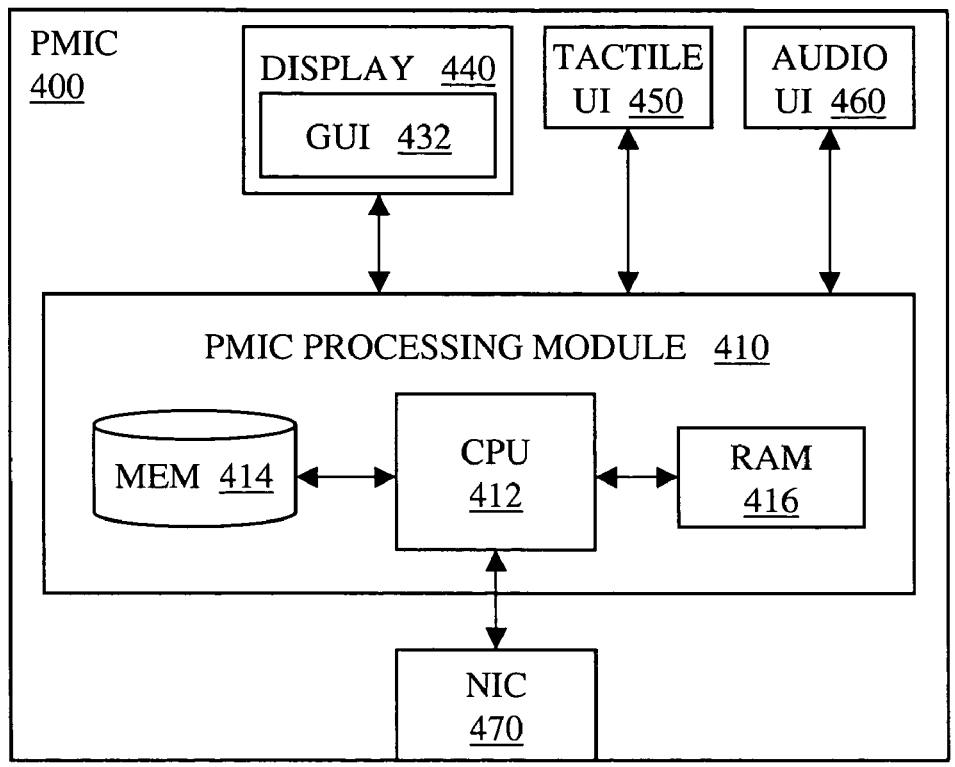
FIG. 4A is a functional block diagram of a enterprise worker's PBX-Messaging Integration Client (PMIC), according to the preferred embodiment.

Illustrated in FIG. 4A is a functional block diagram of a user's PMIC140-142. The PMIC 400 generally includes the hardware and software necessary to provide access to and exchange voice and control signals with another VoIP client including, in some embodiments, the PBX 110. In particular, the PMIC 400 comprises a processing module 410, display 440, tactile user interface 450 preferably including a keyboard, a AUI 460 with sound card and speaker, and a network interface card (NIC) 470 operably coupled to the data communications network 150.

Figure 4B:
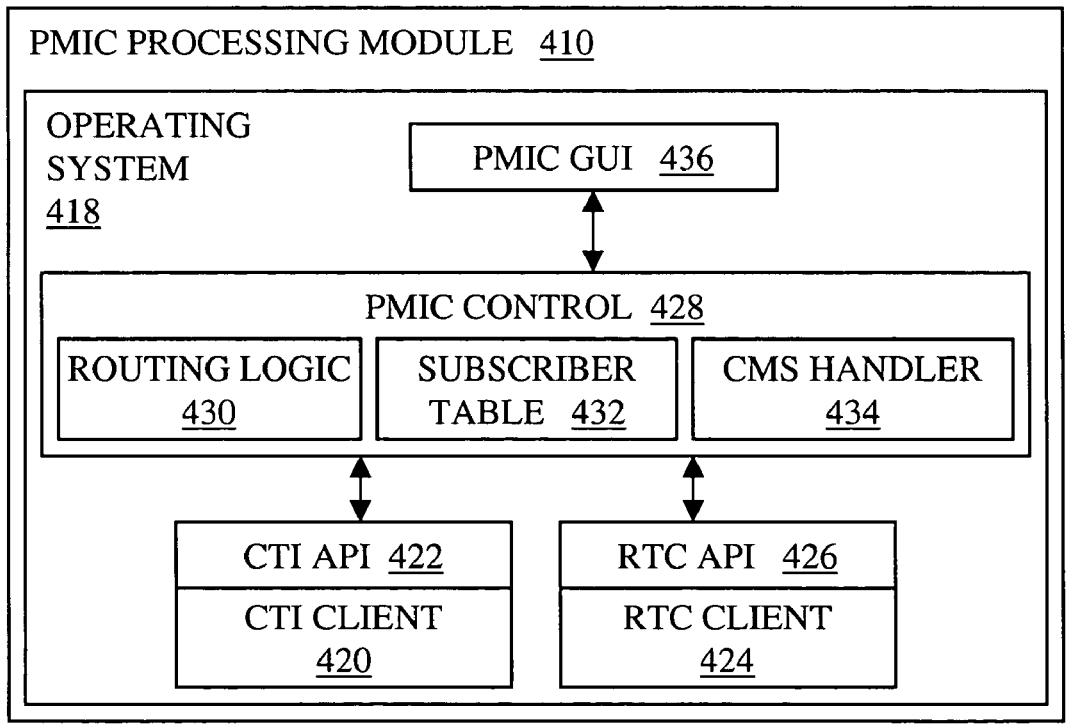
FIG. 4B is a functional block diagram of a PMIC processing module, according to the preferred embodiment.

The processing module 410 generally comprises hardware components including a central processing unit 412, computer memory 414, and random access memory (RAM). As illustrated in FIG. 4B, the processing module 410 may further comprise software and or firmware components including a PMIC controller 428 and a PMIC graphical user interface (GUI) 434 used by the enterprise worker to monitor and configure the PMIC 428 as well as bridge between the PBX domain and the VoIP domain. The PMIC 428 in the preferred embodiment is adapted to monitor calls involving a PBX phone 130-132, intervene in calls under certain circumstances in a manner defined by the user, and establish media sessions on behalf of an enterprise worker in parallel with a telephone call.

Upon receipt of an incoming call, the PMIC 428 generally consults routing logic 430 to whether to forward an incoming call to another PBX phone or other device, for example, or respond with a message transmitted via the network 150. In the process of monitoring calls involving a user's PBX phone, the PMIC 428 may consult the subscriber table 432 to identify any Instant Messaging (IM) buddies in a contact list of changes in the enterprise worker's telephonic presence. In some circumstances, the PMIC 428 may also consult the concurrent media session (CMS) handler 434 to initiate transmission of an instant message, text chat or other voice and/or video media session between the PMICs of the users that are engaged in telephonic communication.

PMIC processing module 410 further comprises a CTI client 422, preferably a CTI protocol stack, and Real-Time Communications (RTC) client 426 running on top of an operating system 418 such MS WINDOWS also by Microsoft Corporation. The CTI client 422 together with its CTI application programming interface (API) 420 provides the underlying functionality used to implement the various call control functionality embodied in the PMIC processing of the preferred embodiment. The RTC client 426 with RTC API 426 provides support for the Session Initiation Protocol (SIP) used in some embodiments to enable the CMSs, as discussed in greater detail below.

Although the PMICs 140-142 in the preferred embodiment are personal computers, one skilled in the art will appreciate that any of a variety of processing devices including desktop computers, laptop computers, personal digital assistants (PDA), Internet-enabled appliances, or mobile communication devices such as cellular phones may be adapted for purposes of this invention.

Figure 5A:
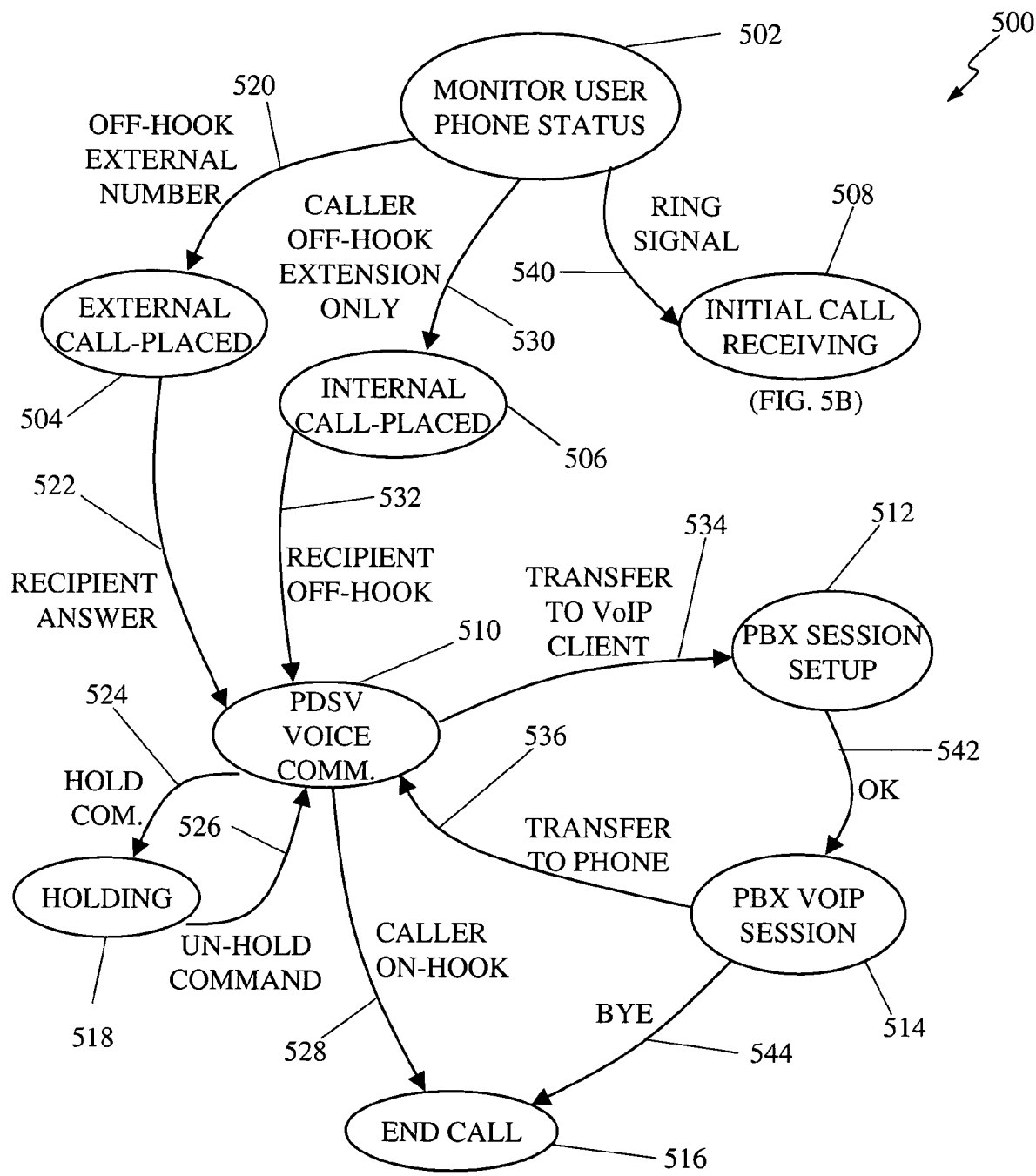
FIGS. 5A and 5B is a state diagram characterizing the PBX with which the preferred embodiment interoperates, according to the preferred embodiment.
Figure 5B:
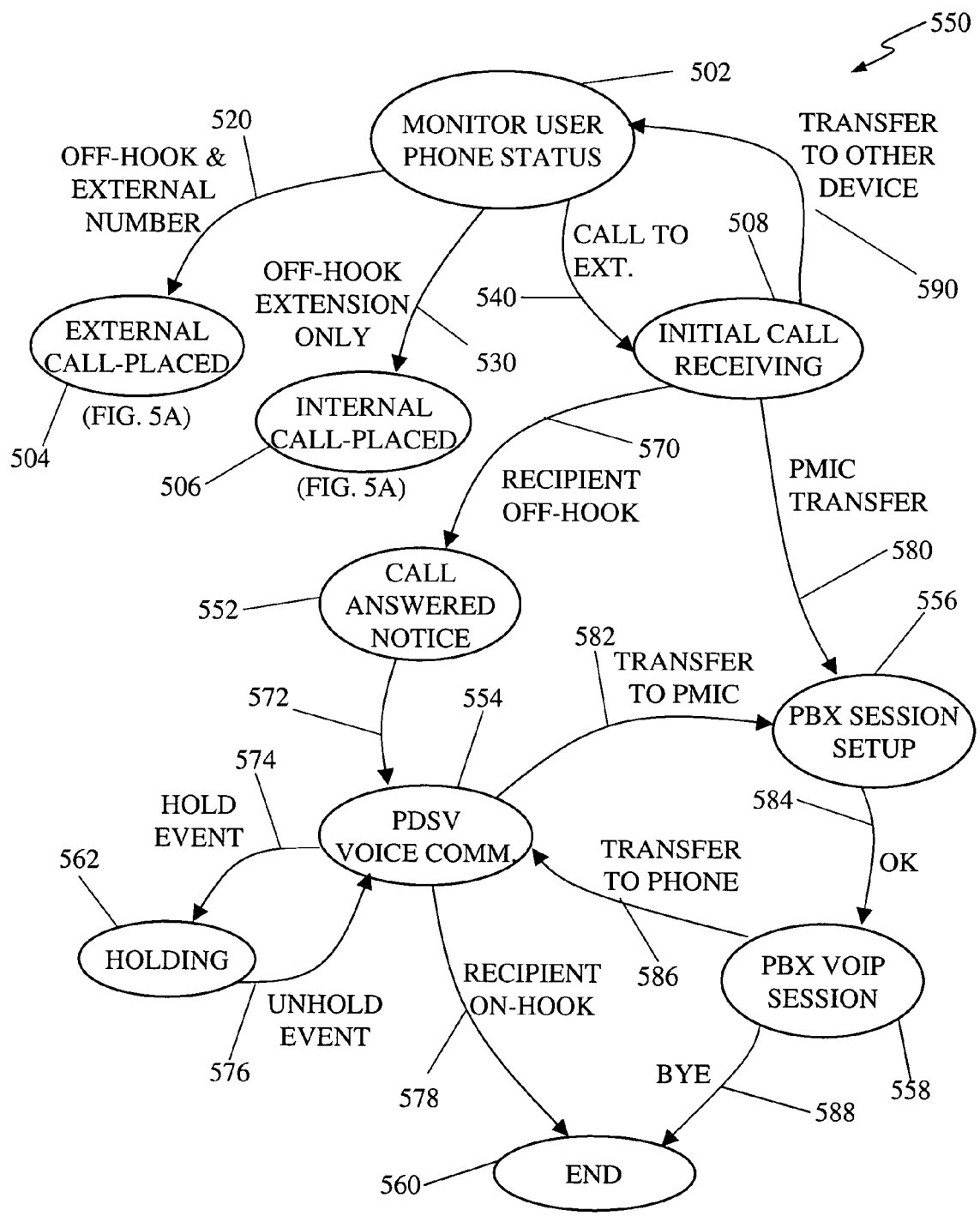

Illustrated in FIGS. 5A and 5B is a state diagram characterizing the PBX with which the preferred embodiment interoperates. The PBX 110 generally monitors (state 502) the trunk lines to PSTN 102 as well as the internal phones 130-132. The operation of the PBX 110 characterized by the method of FIGS. 5A and 5B generally falls into at least one of three different categories, namely, an outgoing call placed by a PBX user phone 130-132 to a device external to the PBX 110, a internal call placed by a user phone 130-132 to another phone 130-132 within the PBX 110, and or an incoming call to a user phone 130-132 from a device external to the PBX 110.

Figure 6:
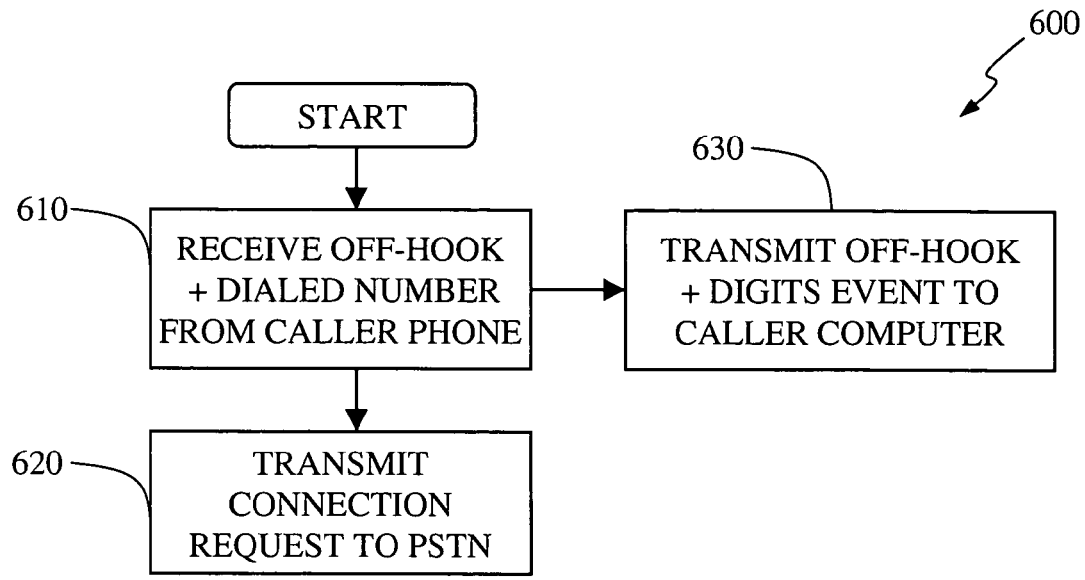
FIG. 6 is a flowchart of the PBX external-call-placed processing, according to the preferred embodiment.

When a call is initiated by a user phone 130-132, an off-hook signal is transmitted from the phone to the PBX 110 with "digits" or dual-tone multi-frequency (DTMF) signals representing a phone number or a PBX extension number. If the off-hook signal 520 is accompanied by the phone number to an external phone, the PBX 110 transitions to an external call-placed state 504, illustrated in greater detail in the external call process 600 of FIG. 6. Referring to FIG. 6, the PBX 110 identifies the digits representing external phone number received (step 610) from user phone and transmits (step 620) a connection request out to the PSTN 102. Since the preferred embodiment of the PBX 110 is enabled with CTI, the PBX also transmits (step 630) off-hook plus dialed-number events to the associated caller's computer 140-142 via the IP network 150. The off-hook and dialed-number events are messages used to notify a device registered with the PBX, i.e. the caller's PMIC, that user phone has transitioned from on-hook to off-hook to make the call. In the preferred embodiment, a client on the network 150 must have registered for the notification at the PBX 110 using a registration event, e.g. a CTI message, requesting notifications about the state of user phone 130-132 identified by its extension number. Once registered, the PBX 110 directs the off-hook plus dialed-number events registered client.

Figure 7:
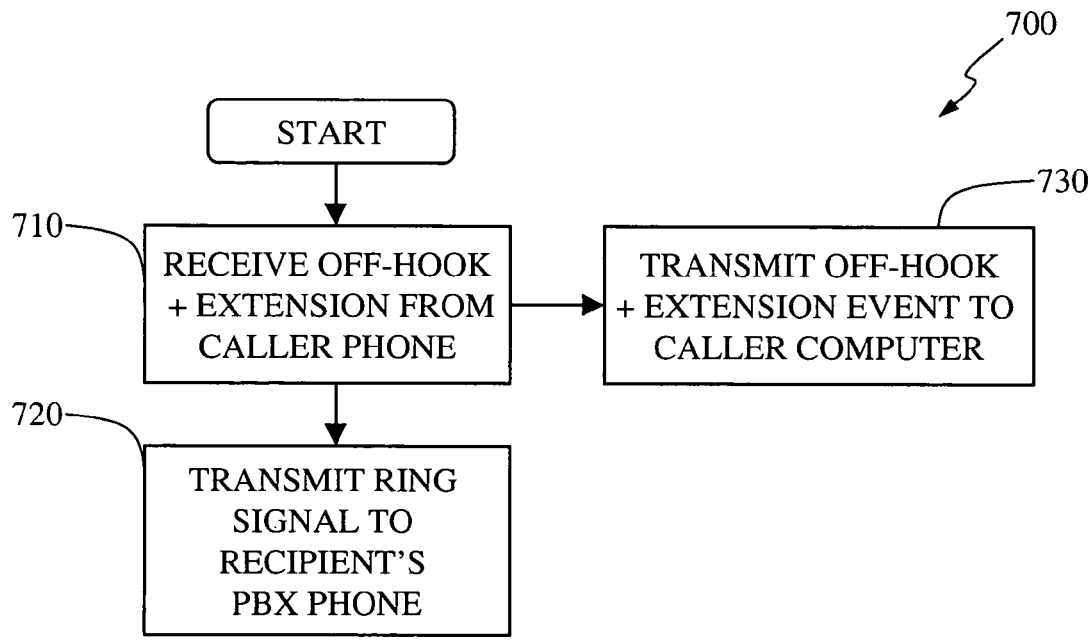
FIG. 7 is a flowchart of the PBX internal-call-placed processing, according to the preferred embodiment.

Referring again to FIG. 5A, if the off-hook signal 530 is transmitted from the PBX phone 130-132 is accompanied by an extension number of a PBX phone 130-132 within the PBX 110, the PBX transitions to an internal call-placed state 506 illustrated in greater detail in the internal call process 700 of FIG. 7. Referring to FIG. 7, the PBX 110 identifies the extension number received (step 710) from user phone and transmits (step 720) a ring signal to the call recipient's phone. The PBX also transmits (step 730) an off-hook plus dialed-number event with the recipient's extension number to the caller's PMIC 140-142 via the IP network 150. The off-hook dialed-number event is preferably a CTI message, used to notify the caller's computer that caller's phone is now in the off-hook state as well as the particular extension dialed. In the preferred embodiment, the off-hook plus dialed-number event including the extension is transmitted indirectly from the PBX 110 through a CTI Server to the caller's computer, although the PBX may be used to directly transmit the event to the caller's PMIC.

Referring to FIG. 5A, if the PBX 110 receives an answered signal 522 from the external call recipient, the PBX transitions from the external call-placed state 504 to the PDSV voice communication state 510. Similarly, an off-hook signal 532 from the call recipient in response to the internal call-placed 506 will also cause the PBX 110 to transition to the PDSV voice communication state 510. The PDSV voice communication state 510 represents the processing necessary for the PBX 110 to maintain voice communication, which may involve switch control 202 operations such as analog-to-digital conversion and filtering, signaling and the like. If the call recipient answers using is a PBX phone, the PBX 110 may also send a call-answered event comprising the extension of the call recipient's PBX phone to the same registered client that the off-hook plus dialed-extension event was sent. The PDSV voice communication generally continues until a calling or called party goes on-hook 528 and terminates the voice communication (state 516).

Figure 8:
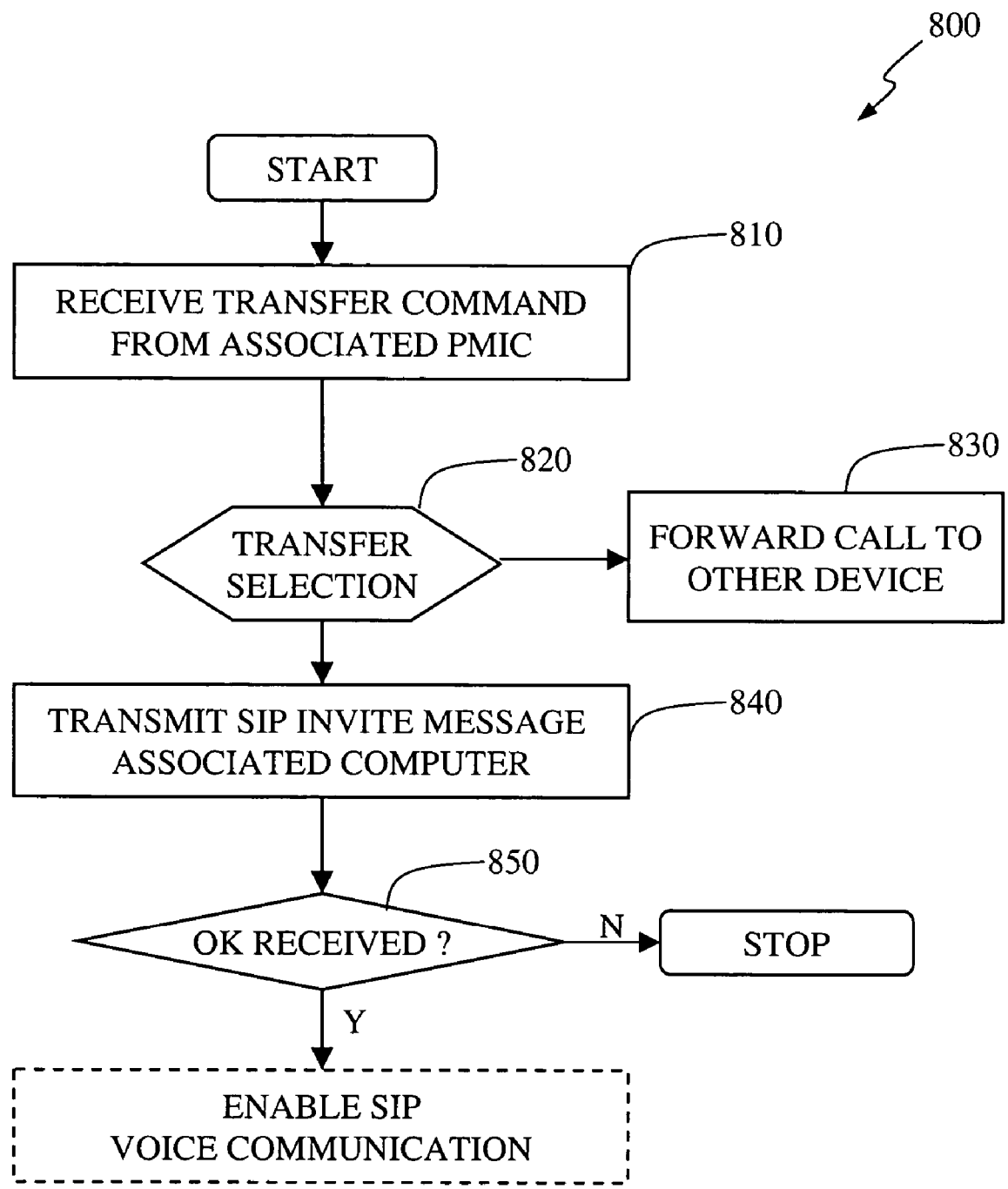
FIG. 8 is a flowchart of the PBX voice-over-IP (VoIP) session setup, according to the preferred embodiment.

At any time during the PDSV voice communications (state 510), the call in progress may be transferred to another device. If the PBX 110 is enabled with a VoIP protocol, for example, the PBX can transfer the call in response to a transfer command 534, e.g. a CTI message, with an identifier specifying the device to which the voice communication is to be redirected. If transferred to a VoIP client in the enterprise worker's PMIC, for example, the PBX 110 attempts to establish a VoIP session (state 512) and transfer the caller side of the communication to a VoIP device. In the session setup process 800 associated with the session setup (state 512) illustrated in FIG. 8, the PBX 110 uses the identifier from the transfer command received (step 810) to determine in the transfer selection mode (step 820) where to forward the VoIP call. A transfer command including a universal resource (URI) designating the caller's PMIC, for example, causes the PBX 110 to issue (step 840) a session request message, e.g., a SIP INVITE, to a VoIP client in the caller's PMIC. If the PBX 110 receives a SIP OK message 542 in response to the session request message, the SIP OK testing (step 850) is answered in the affirmative and SIP VoIP session (state 514) replaces the prior PDSV communication between the caller's phone and PBX 110. The PBX 110 may also be adapted to transfer calls to other resources (step 830) including other PBX phones or external phones, for example.

After the SIP VoIP session is established (state 514), a participant in the session may terminate the session and effectively end the call (state 516) by issuing a VoIP termination message such as a SIP BYE message 544. In the alternative, the participant may transfer the call back to a phone set (state 510) using a transfer command 536 including the appropriate phone extension.

Any time during the PDSV voice communications (state 510), the call in progress may be placed on hold (state 518) by a hold PDSV operation code from the user's PBX phone or by a hold command 524 received by the PBX 110 from the user's PMIC 428 via the network 150. Similarly, the call may be taken off hold in response to the appropriate operation code or an un-hold command from the user's PMIC 428.

Figure 9:
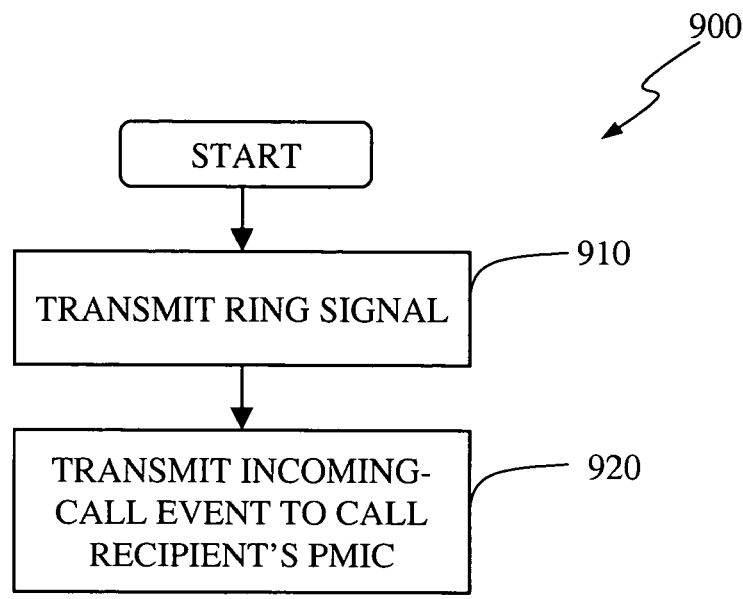
FIG. 9 is a flowchart of the PBX call-receiving state processing, according to the preferred embodiment.

In addition to outgoing calls discussed above, the PBX 110 is also enabled to facilitate incoming calls. When a call 540 is directed to a user phone 130-132 from either another PBX user phone 130-132 or external PSTN line, the PBX 110 transitions into the initial call receiving state 508. As illustrated the call receiving procedure 900 of FIG. 9 associated with the initial call receiving state 508 of FIG. 5B, the PBX 110 transmits (step 910) the incoming connection request to the recipient's phone in the form of a ring signal. The PBX 110 in the preferred embodiment also transmits (step 920) an incoming-call event, e.g. a CTI message, via the network 150 to notify the recipient's PMIC of the connection request.

Figure 10:
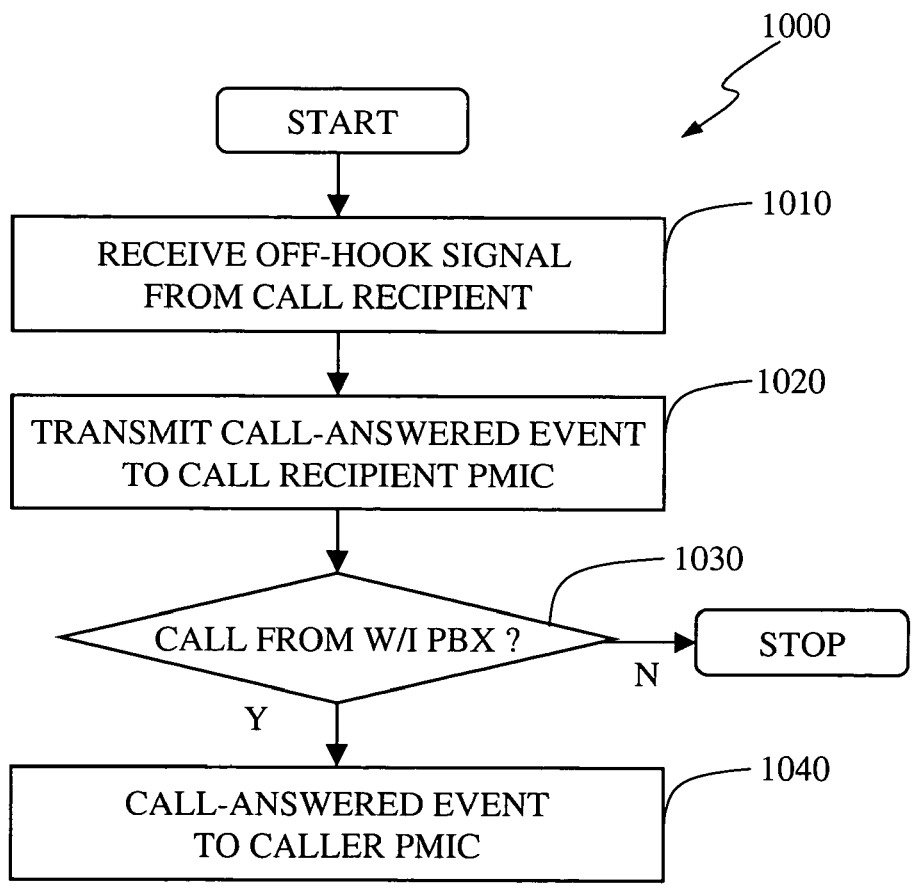
FIG. 10 is a flowchart of the PBX call-answered state processing, according to the preferred embodiment.

In the preferred embodiment, the incoming call may be answered at the recipient's PBX phone or by way of a CTI answer event received by the PBX 110 from the user's PMIC via the network 150. Upon receipt of an off-hook signal 570 from the PBX phone, the PBX 110 transitions to the call answered (state 552) illustrated in more detail in the call answered process 1000 of FIG. 10. As shown, receipt of the off-hook signal (step 1010) causes the PBX 110 to transmit (step 1020) a first call-answered event, e.g., a CTI message, notifying the recipient's PMIC that the call has been accepted at the associated PBX phone. If the call is also initiated from a PBX phone 130-132 within the PBX system 100, internal-caller testing (step 1030) is answered in the affirmative and the PBX 110 generates a second call-answered event transmitted (step 1040) to the caller's PMIC. The second call-answered event, e.g. a CTI message, notifies the caller's PMIC when the call is answered by the call recipient at the recipient's PBX phone or other device. Subsequent PDSV voice communications in state 554 are analogous to that discussed above in context of PDSV voice communication state 510.

When the incoming call is answered at the call recipient's PMIC, the PBX 110 generally receives an answer command accompanied by a transfer command from the PMIC. The transfer command includes a URI designating the user's PMIC or a SIP user agent therein and the PBX 110 transitions to the PBX's VoIP session setup state 556 consistent with the VoIP session setup state 514 discussed above. If the session request message issued by the PBX 110 is accepted, the PBX transitions into the PBX's VoIP session (state 558) and the PDSV voice communication terminated. The recipient may subsequently transfer 586 the call between the PDSV voice communication (state 554) and the VoIP session (state 558) in the manner described above.

If the transfer command 590 received while in the initial call receiving (state 508) includes a URI designating a phone, computer, or user agent other than that of the recipient, the PBX 110 effectively transfers the call to the other device and returns to monitoring the phone status (state 502).

Figure 11:
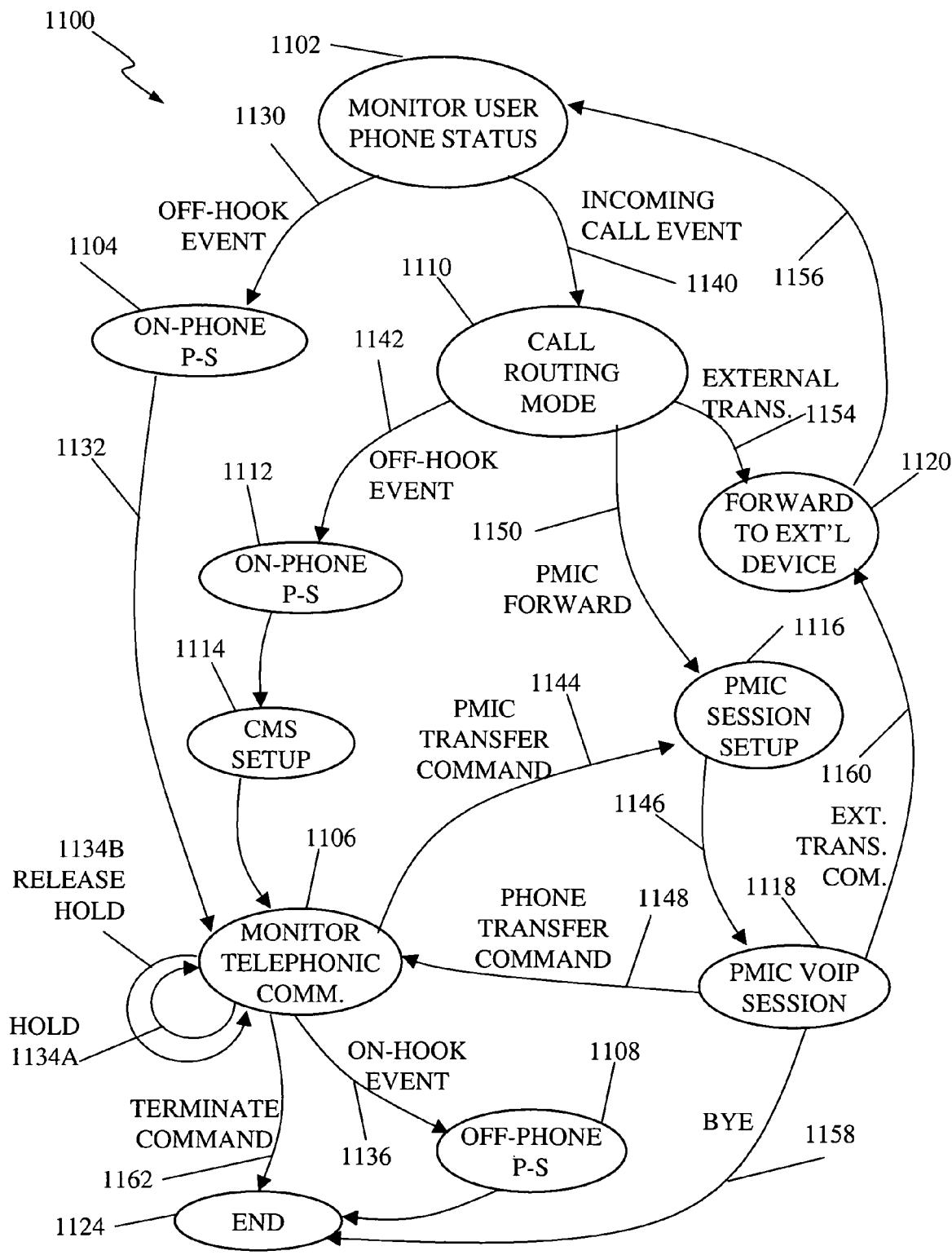
FIG. 11 is a state diagram characterizing the PBX-Messaging Integration Client (PMIC) processing, according to the preferred embodiment.

Illustrated in FIG. 11 is a state diagram characterizing the PMIC for extending the scope and control of a PBX system and extending the scope of the presence sensing into the telephonic domain. The PMIC process 1100 is preferably embodied in one or more user computers within an enterprise that may have a new or existing PBX system consistent with operations discussed above. Each user computer 140-142 is adapted to execute the PMIC process 1100, thereby making them PMICs. The plurality of PMICs that interoperate with one another and the PBX 110 constitute a PMIC system. In general, there is a one-to-one relationship between a PMIC and an enterprise worker's PBX phone.

A PMIC generally monitors (state 1102) the IP network 150 for messages transmitted by the PBX 110 as well as other PMICs in the enterprise. The messages from the PBX 110 generally fall into one of two categories, namely, call-placed messages indicating that the PBX phone 130-132 with which the PMIC is associated is being used to place a call or incoming call messages indicating that the associated PBX phone is receiving a call from either another PBX user phone or external line.

When the PBX phone associated with the PMIC is used to place a call, the PMIC receives the off-hook event 1130 generated by PBX 102 and transitions into the on-phone presence-state (P-S) processing (state 1104). The P-S processing (state 1104) is illustrated in greater detail in the on-phone P-S processing method 1200 of FIG. 12A. As illustrated, the PMIC consults (step 1210) its local subscriber table 432 to identify the call recipient's presence-state subscribers. A P-S subscriber is party that has registered to receive notice of a co-worker's online presence and or telephonic availability. If one or more subscribers are identified (step 1220), an on-phone event, e.g., a SIP message, is transmitted (step 1230) to each subscriber to indicate that the party whose presence-state is being monitored has picked up the PBX phone. Referring to FIG. 11, the PMIC then indirectly monitors the telephonic communications (state 1106) by listening for any CTI events signifying a change in the ongoing telephonic communication.

When the PBX phone associated with the PMIC receives a call, the PMIC receives an incoming-call event 1140 and transitions to a call-routing mode (state 1110) in which the PMIC consults its routing logic 430. The routing logic 430 is customized by the user and prescribes the action to be taken in response to an incoming call. In the preferred embodiment, the PMIC is adapted to perform one or more of the following: (1) permit the incoming call to ring at the user PBX phone without intervention, (2) transfer the incoming call to the user's PMIC, (3) transfer the incoming call to another device. e.g., the user's cell phone, (4) transfer the incoming call to another PBX phone, or (5) transmit an instant message to the caller. In the preferred embodiment, the user can define individual call-routing rules that prescribe how to respond to the incoming calls as a function of when the call is received, the telephone number or extension of the caller, the time of day and day of week, and the user's presence-state, for example.

Figure 12A:
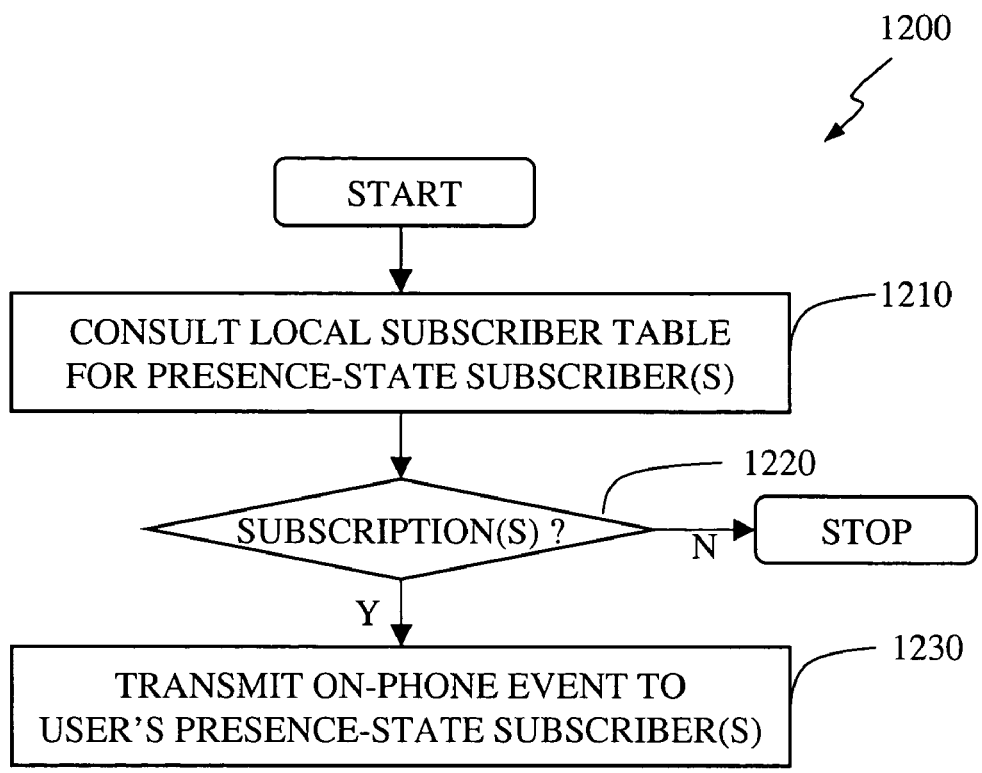
FIG. 12A is a flowchart of the on-phone presence state processing, according to the preferred embodiment.
Figure 13:
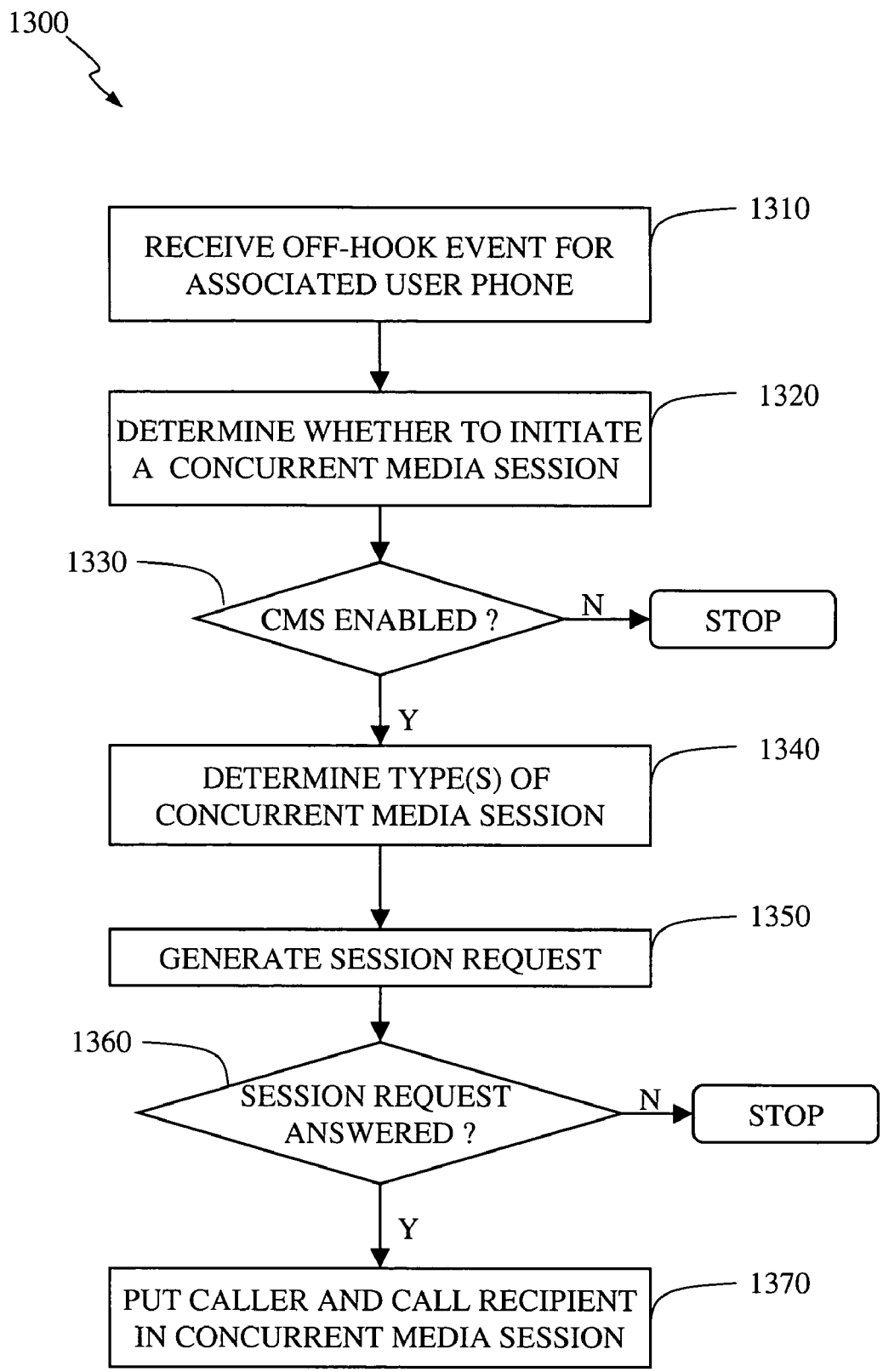
FIG. 13 is a flowchart of the concurrent media session setup procedure, according to the preferred embodiment.

If the routing logic 430 prescribes no action and the call recipient answers the PBX phone, the PMIC receives an off-hook event 1142 from the PBX 110. The PMIC process 1100 advances to an on-phone presence-state (state 1112), as illustrated in FIG. 12A, as well as a concurrent media session (CMS) setup (state 1114). The on-phone presence-state (state 1112) is consistent with the on-phone P-S processing (state 1104) described above. As illustrated in the CMS setup procedure 1300 of FIG. 13 associated with the CMS setup (state 1114), the PMIC uses the extension and or phone number from the off-hook event received (step 1310) to determine (step 1320) whether to initiate a media session concurrently with the telephonic communication that began when the phone was answered. A media session as used herein refers to a network-domain dialogue between the caller and call recipient established and maintained separate from the telephonic communication. In the preferred embodiment, the concurrent media session may take one of more of the following four forms: (1) a "message session" such as a SIP instant message, (2) a "text session" such as a SIP text chat session, (3) a "multimedia session" in which a SIP video or audio is exchanged, (4) a document exchange session, or (5) computer GUI interface sharing such as a window-based operating system's "desktop sharing."

Referring again to FIG. 13, the CMS testing (step 1330) is answered in the affirmative if, for example, call recipient's PMIC is configured to automatically attempt to initiate a CMS with all incoming PBX calls, or if the incoming call is from a PBX extension included in a group of one or more numbers pre-selected or otherwise approved by the call recipient. The selection of the type(s) of CMS(s) to be established are determined from user-defined CMS configuration parameters maintained by the call recipient's PMIC handler 434. A CMS configuration parameter may be set with a default value so that a text chat session or a video session, for example, is automatically established in response to a telephone call. Independent of the initial session type, either user may then manually escalate to a supplemental CMS including document share, screen share mode, or video session, for example. The one or more CMSs are initiated with a session request, e.g., a SIP message, directed from the recipient's PMIC to the caller's PMIC or other SIP conference calling center, e.g., a multi-point control unit known to those skilled in the art. If the session request is accepted with a SIP OK message, the session-request-answered testing (step 1360) is indicated in the affirmative and the media session launched (step 1370) between the PMICs of the caller and recipient. In the preferred embodiment, the CMS may be maintained or terminated separate and independent of the telephonic communication. Alternately, the CMS sessions could be terminated with the telephone communication session ended.

Figure 12B:
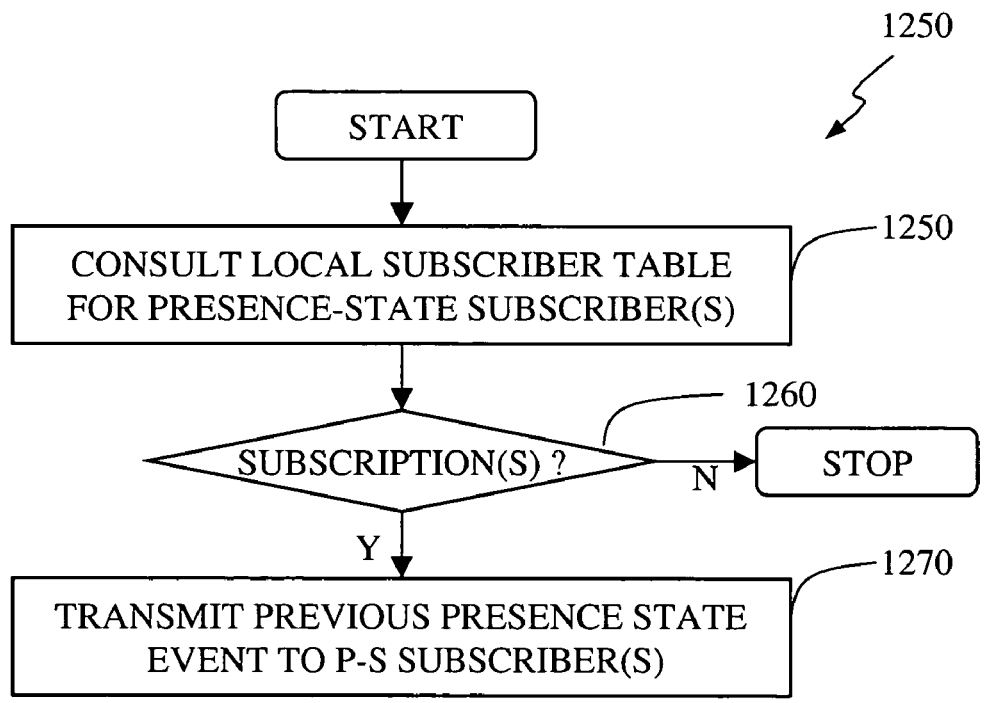
FIG. 12B is a flowchart of the off-phone presence state processing, according to the preferred embodiment.

Referring again to FIG. 11, the PMIC process 1100 proceeds to passively monitor (state 1106) the network 150 for any events signifying a change in the ongoing telephonic communication. When the phone is hung up, for example, the PBX 110 transmits an on-hook event 1136, e.g. a CTI message, to the recipient's PMIC that causes the PMIC process 1110 to transition to the off-phone P-S processing (state 1108). In the off-phone P-S processing of FIG. 12B, associated with the phone P-S state 1108, the PMIC consults (step 1250) its local subscriber table 432 to identify the call recipient's current presence-state subscribers. If one or more subscribers are identified, the subscriptions testing (step 1260) is answered in the affirmative and each subscribers sent (step 1270) an P-S status event, e.g., a SIP message, indicating the availability status of the call recipient immediately prior to going off-hook to answering the call. In an alternate embodiment, the availability status sent to each subscriber is on-line status.

Apart from the monitoring function (state 1106), the PMIC in some embodiments is also adapted to issue commands to the PBX 110 to alter the telephonic communication involving the associated PBX phone. In the preferred embodiment, the caller may alter the ongoing telephonic communication by taking one of the following actions: (1) terminate the call, (2) place the call on hold, (3) transfer the call, or (4) establish a conference call with one or more additional parties. The user may terminate the call from the PMIC by issuing a terminate command 1162, e.g. a CTI message, that instructs the PBX 110 to end (state 124) voice communications with the user' PBX phone. The user may also issue a hold command 1134A, e.g., a CTI message, to temporarily discontinue the voice communications, after which the PMIC process 1100 resumes passively monitoring (state 1106) the PBX 110. An analogous release-hold command 1134B may be issued by the user from the PMIC to remove the hold and enable voice communication.

Prior to ending the call, the user may also transfer the call from the PBX phone to another device by issuing a transfer command to the PBX 110. Depending on the identifier-URI, phone number, or extension-the PBX 110 may transfer the call to the user's PMIC, the user's cell phone, or another PBX extension, for example. When transferred by command 1144 to the user's PMIC, the PMIC process 1100 transitions to the PMIC session setup (state 1116) in which the PMIC and PBX 110 exchange SIP INVITE and OK messages necessary to establish a VoIP session (state 1118) to replace the telephonic communication. While in the PMIC VoIP session (state 1118), the user acting through the PMIC GUI 436 can issue a PBX phone transfer command 1148 to restore the telephonic communication (state 1106), issue a SIP BYE 1158 message to end the call (state 1124), or issue an external-device transfer command 1160 causing the PBX 110 to forward (state 1120) the call to any device specified by the user.

In addition to permitting an incoming call to be answered at the user's PBX phone, the call routing logic 430 may be configured to cause the PMIC in the call routing mode (state 1110) to automatically respond with one or more of the following actions: (1) transfer an incoming call to the PMIC session setup (state 1116), transfer or forward the call to an external device (state 1112), or (3) reply with a message to the caller's PMIC using an Instant Message. In the preferred embodiment, routing logic 430 is configured by the user to direct calls depending on the caller's identification, the time, and the date, for example.

The flow diagrams in FIGS. 14 through 20 discussed below illustrate various aspects of the PMIC processing 1100 of the preferred embodiment. These figures are provided by way of example and not limitation.

Figure 14:
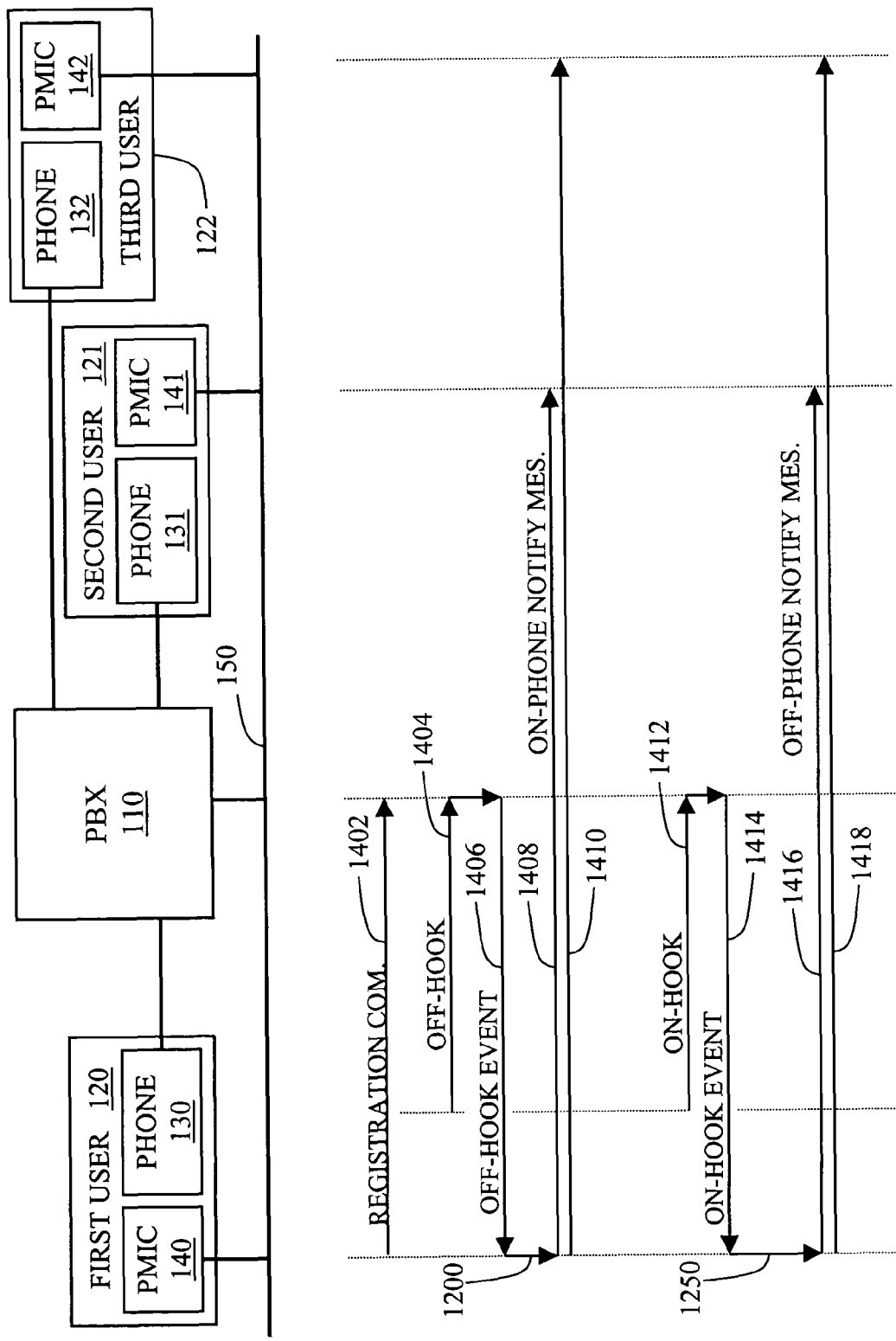
FIG. 14 is flow diagram depicting the method of distributing telephonic presence-sense notices, according to the preferred embodiment.

Illustrated in FIG. 14 is flow diagram depicting the method of distributing telephonic presence-state notices in the PBX system 100. Prior to configuring a user's PMIC to perform P-S notification, a user generally transmits a registration command to the PBX 110 to associate the user's PMIC with the user's phone extension. This causes the PBX 110 to transmit subsequent event messages pertaining to the user's PBX phone to the user's PMIC. The class of events transmitted by the PBX to a PMIC generally includes, but is not limited to: off-hook plus digits events, off-hook plus extension events, extension-dialed events, transfer events, incoming-call events, and answer events. In the following examples illustrated in FIG. 14 through FIG. 20B, the first user PBX phone 130 is identified by extension number x1234, the first user PMIC 140 identified by URI 1234@proxy.com, the second user PBX phone 131 is identified by extension number x5678, and the second user PMIC 141 identified by URI 5678@proxy.com.

The registration command 1402 causes the PBX 110 to send to the first user's PMIC various CTI events relating to the first user's phone 130. The registration command 1402 may require that the first user 120 enter a user identifier and password, although other forms of authentication may be implemented. Similarly, the PBX 110 is able to associate CTI commands from this first user's 120 PMIC 140 with the phone 130 extension.

At some later point in time, when the first user 120 picks up the phone 130, an off-hook signal 1404 is relayed by the PBX 110 to the first user PMIC 140 in the form of an off-hook event, preferably a CTI off-hook message 1406. Receipt of the CTI event stimulates the PMIC 140 to automatically change the presence-state for the first user to "on-phone" state. As prescribed by the on-phone presence-state processing 1200, the PMIC 140 consults (method 1200) its subscriber table 432 and transmits a notify message 1408, 1410 to all subscribers 121, 122 by way of the associated PMICs 141, 142. The notify message is preferably a SIP on-phone message advertising the change in the first user's telephonic availability.

When the first user completes the call, the on-hook signal 1412 from the first user phone 130 causes the PBX 110 to send the first user's PMIC 140 an on-hook event 1414, preferably a CTI message. As prescribed by the off-phone present state processing 1250, the PMIC 140 consults (method 1250) the subscriber table 430 and notifies all subscribers 141, 142 of the change in the presence state by way of a SIP notify messages 1416, 1418. In the preferred embodiment, the presence state indicated by the SIP notify messages 1416, 1418 is the presence state that existed just prior to the placement of the call. In an alternative embodiment, the presence state sent when the user goes off-phone may be "on-line" notice. The selection between the two embodiments might be a user-manageable setting.

One skilled in the art will appreciate that the linkage between the PBX phone operation and the presence state is performed entirely within the associated PMIC endpoint itself. Moreover, the presence-state for the user is changed automatically based on receipt of a CTI event without the user manually changing his or her presence state via GUI interaction or other manual input. A principal advantage of this method of presence integration is that it can completely coexist and fully interoperate with all other presence servers, presence collection/distribution servers, and any other SIP proxy servers that might be operational within the network 150. The proposed method is also highly scalable, since it each PMIC is only responsible for the presence management of its associated user PBX phone.

In some embodiments, the PBX 110 is both the source of CTI events and recipient of CTI commands. One skilled in the art will recognize, however, the a PBX may employ a separate and external CTI server (not shown) that provides fan-out capability, user authentication, and other CTI management tasks, as well as protocol translation between the PBX and the CTI client, for example.

Figure 15:
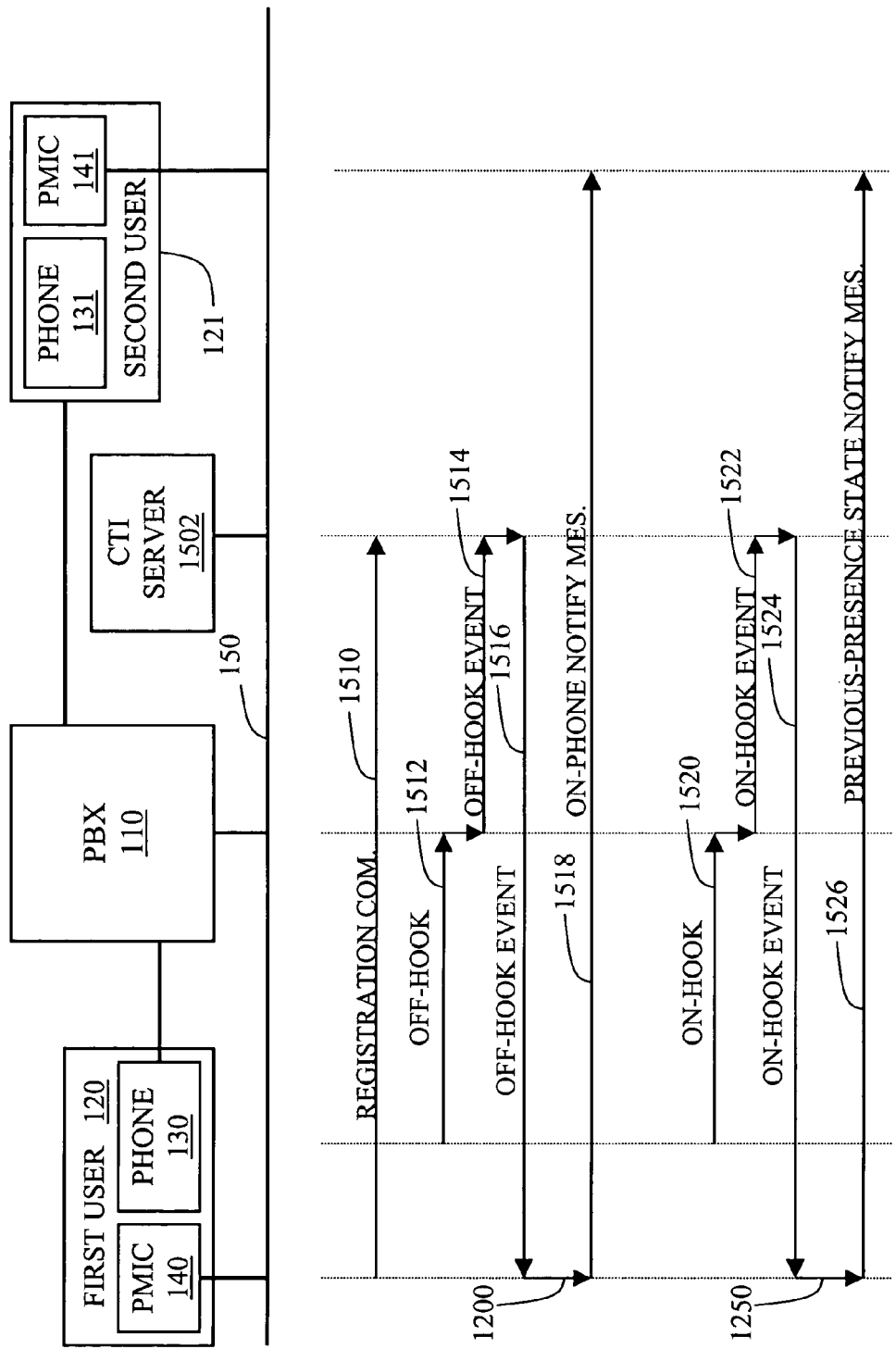
FIG. 15 is a flow diagram demonstrating the use of a networked intermediate server with which the PBX and one or more PMICs may interoperate, according to the preferred embodiment.

Illustrated in FIG. 15 is a flow diagram demonstrating the use of a networked intermediate server with which the PBX and one or more PMICs may interoperate. The CTI server 1502 is adapted to relay messages between the PBX 110 and one or more PMICs using CTI and/or extensible Markup Language (XML) protocols between the CTI server 1502 and the one or more PMICs 120, 121. The proxy server 1502 relays CTI messages between the CTI server 1502 and the PBX 110 using the CSTA CTI protocol, for example. Other protocol translations might also be possible including, but not limited to, HTTP using Get or Post messages via a dedicated IP socket, or SIP using textual information transmitted with SIP MESSAGEs sent between the CTI server 1502 and a PMIC.

As illustrated in FIG. 15, a first user PMIC 140 transmits a registration command 1510, preferably a CTI or XML message, to the CTI server 1502. The registration command 1510 comprises the extension number of the first user phone 130 and enables the CTI server 1502 to create an association between the first user PBX phone 130 and the first user PMIC 140. When the first user phone 130 is used to place a call or answer a call, the PBX 110 relays the off-hook signal 1512 to the CTI server 1502 in the form of a CTI off-hook event 1514. The server 1502, in turn, forwards the CTI/XML off-hook event 1516 to the first user PMIC 140. Reception of CTI off-hook event 1516 stimulates a change in first user's presence state that is propagated to any subscribers via an off-phone notification event 1518, e.g., a SIP message. Similarly, an on-hook signal 1520 is transmitted to the CTI server 1502 in the form of a CTI on-hook event 1522, then transmitted to the first user PMIC 140 in the form of CTI/XML off-hook event 1524. The first user identifies (step 1250) the presence state subscribers to be sent a SIP notify event 1526. One skilled in the art will appreciate that the presence state management in the one or more PMICs of FIG. 14 is functionally equivalent to those in FIG. 14, independent of whether the event messages originating from the PBX 110 are sent directly to the PMICs or indirectly via the CTI server 1502.

Figure 16A:
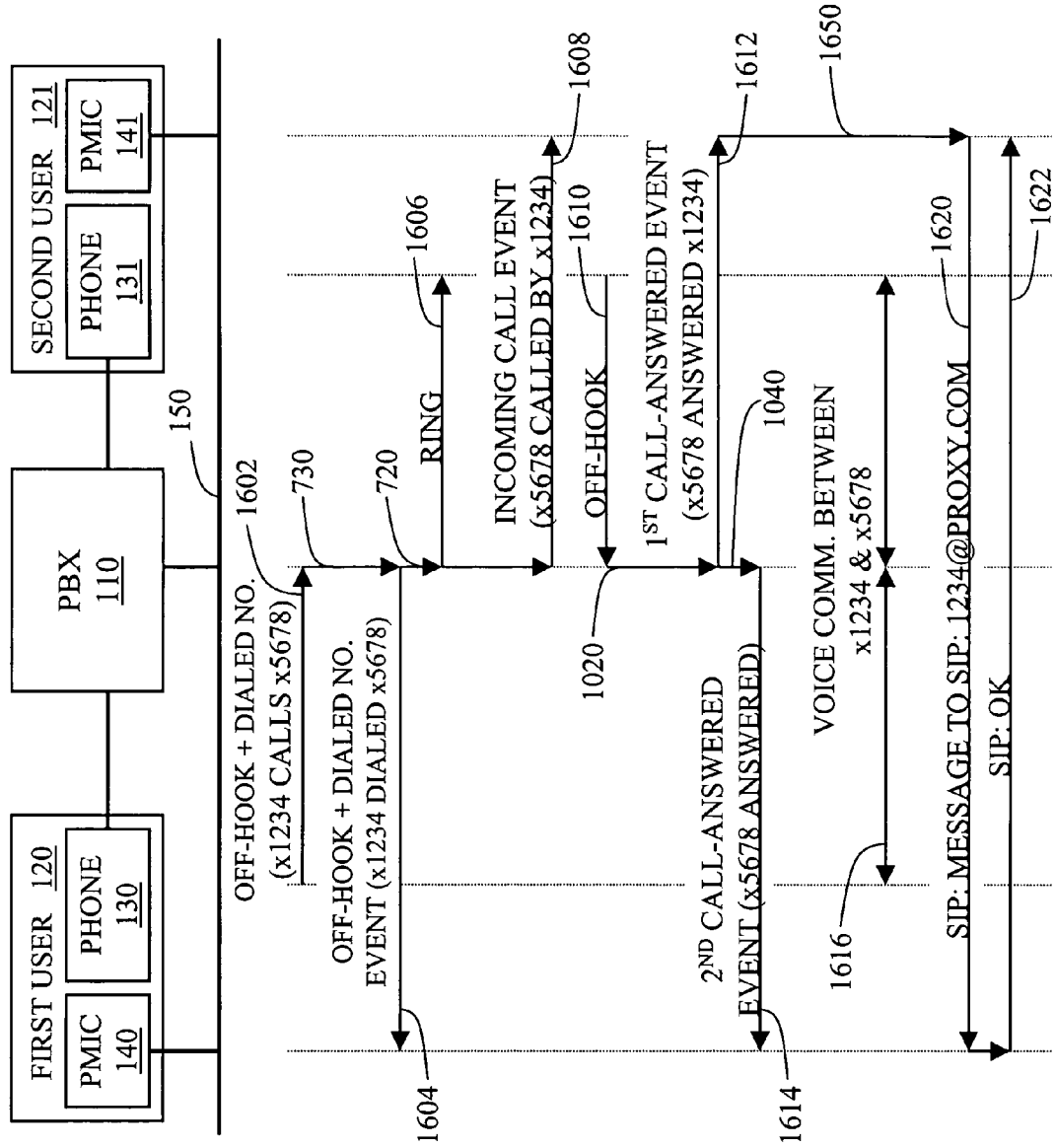
FIG. 16A is a flow diagram demonstrating the procedure for establishing a first category of CMS between calling parties, according to the preferred embodiment.

Illustrated in FIG. 16A is a flow diagram demonstrating the procedure for establishing a first category of CMS between calling parties. In this example, a CMS in the form of a SIP session is automatically initiated between a caller and recipient in the PBX system 100 in response to a telephone call. For purposes of demonstration, let the first user phone 130 have extension number x1234 and the second user phone 131 have extension number x5678. When the first user 120 depresses Dual Tone Multi Frequency (DTMF) keys on the PBX phone 130 to call the second user 130, an off-hook signal 1602 comprising the call recipient's extension is transmitted to the PBX 110. In addition to the ring signal 1606 transmitted (step 720) to the second user's phone 131, the PBX 110 also generates (step 730) an extension-dialed event 1604 to the caller's computer, PMIC 140, as notice that a call has been placed to the extension number x5678. Similarly, the second user's PMIC 141 is notified via the incoming-call event 1608 of the incoming call from extension x1234.

If the incoming call is answered with off-hook signal 1610, the PBX 110 puts the first user phone 130 and second user phone 131 in telephonic voice communication 1616. The CTI-enabled PBX 110 also responds to the off-hook signal 1610 with a first call-answered event 1612 transmitted (step 1020) to the second user's PMIC 141 as well as a second call-answered event 1614 transmitted (step 1040) to the first user's PMIC 140.

In response to the first call-answered event 1612, the second user's PMIC 141 automatically initiates (step 1650) a media session, preferably a SIP chat session, concurrent with the telephonic voice communication 1616. The process of initiating (step 1650) the media session is set forth in greater detail in CMS setup 1114 of FIG. 13. In this example, the media session is a SIP session including a simple SIP:MESSAGE message sent from second user's PMIC 141 to the first user's PMIC 140. In order to generate this SIP message 1620, in the preferred embodiment, the second user's PMIC 141 derives the SIP URI of the first user's PMIC 140 in accordance with a SIP dial-plan. The dial-plan associates an extension, e.g., abcd, included in an event message with a SIP URI, e.g., SIP:abcd@someproxy.com. In this manner, the second user PMIC 141 extracts the extension number 1234 from the incoming-call event 1608 and generates a SIP MESSAGE transmitted to SIP: 1234@proxy.com. Other suitable dial-plans that allow the call recipient's PMIC to deduce the caller's URI from the calling extension are also possible. For example another dialing plan might associate extension 1234 with SIP:user91234@proxy.com where user 1234's PMIC has this SIP URI.

After the SIP exchange is completed with SIP OK 1622, SIP text messaging windows are open on both first user's PMIC 140 and second user's PMIC 141, thereby allowing the first user 120 and second user 121 to text chat with one another concurrent with the voice communication 1616. One skilled in the art will appreciate that there is no need for the first user 120 or second user 121 to appear on each other's contact lists, nor a need for either user to lookup an IP address or SIP URI. Instead, the SIP session is established automatically based on the PBX call.

Figure 16B:
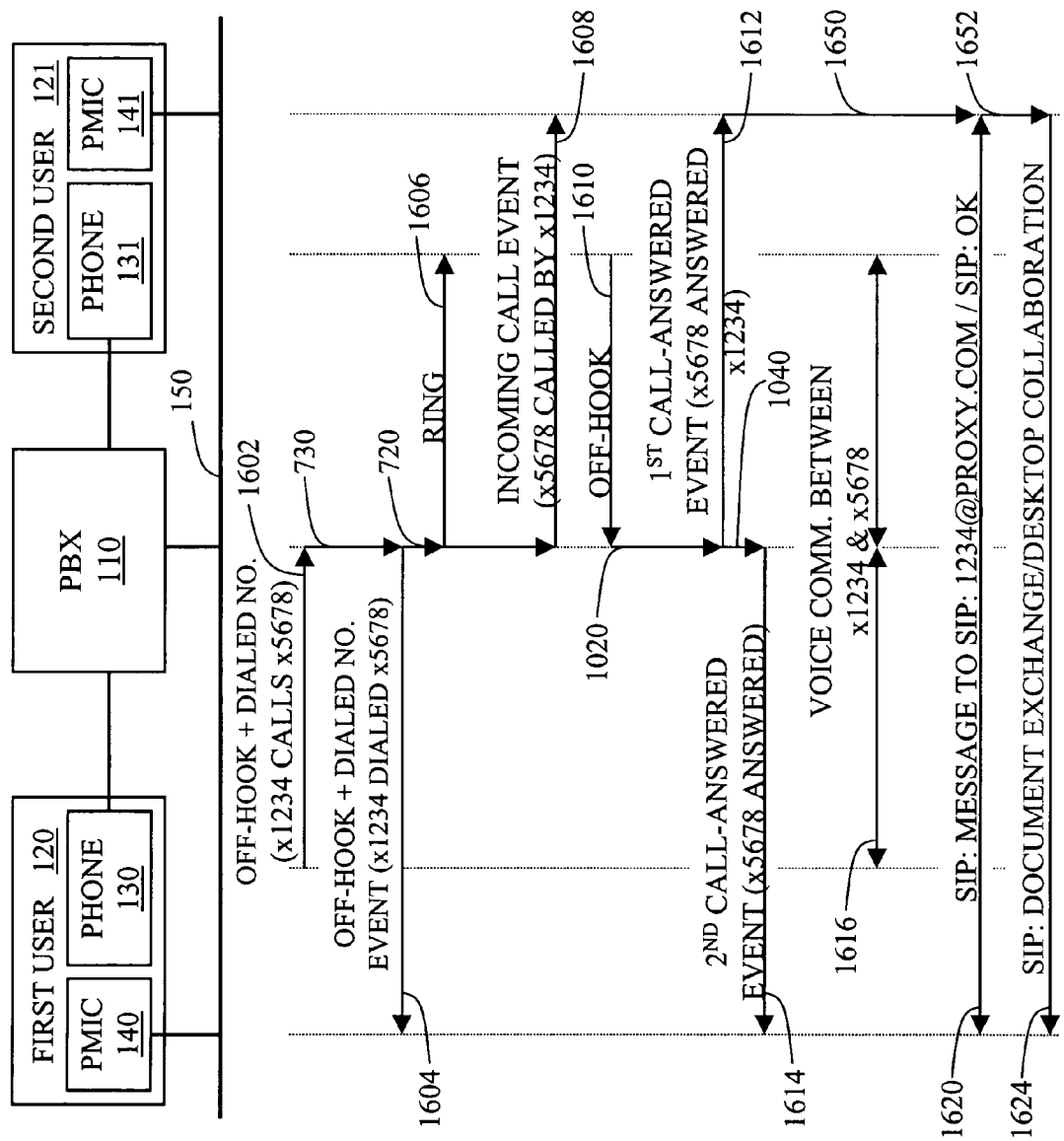
FIG. 16B is a flow diagram demonstrating a first procedure for establishing a second category of CMS between calling parties, according to the preferred embodiment.

Illustrated in FIG. 16B is a flow diagram demonstrating a second procedure for establishing a CMS between calling parties. In this example, the various signals, CTI event messages, and SIP messages in FIG. 16B are replicated from FIG. 16A beginning with the off-hook plus dialed number signal 1602 through the SIP MESSAGE 1620. Here, however, the presence of the SIP MESSAGE 1620, and the corresponding SIP: OK, has established a line of communication between first user 120 and second user 121 that may be exploited to open additional forms of communication. After the SIP session signified by SIP MESSAGE 1620 has been between established, either the first user 120 or the second user 121 may escalate the interaction to other forms of supplemental CMS using built-in capabilities of RTC, for example. In the preferred embodiment, either call participant may establish a supplemental CMS, e.g., a document exchange or a screen sharing session, that runs in parallel to the SIP:MESSAGE 1620. The supplemental CMS 1624 may be manually selected (step 1652) by a user via the user's PMIC GUI 436 or other form of selection input device.

Figure 16C:
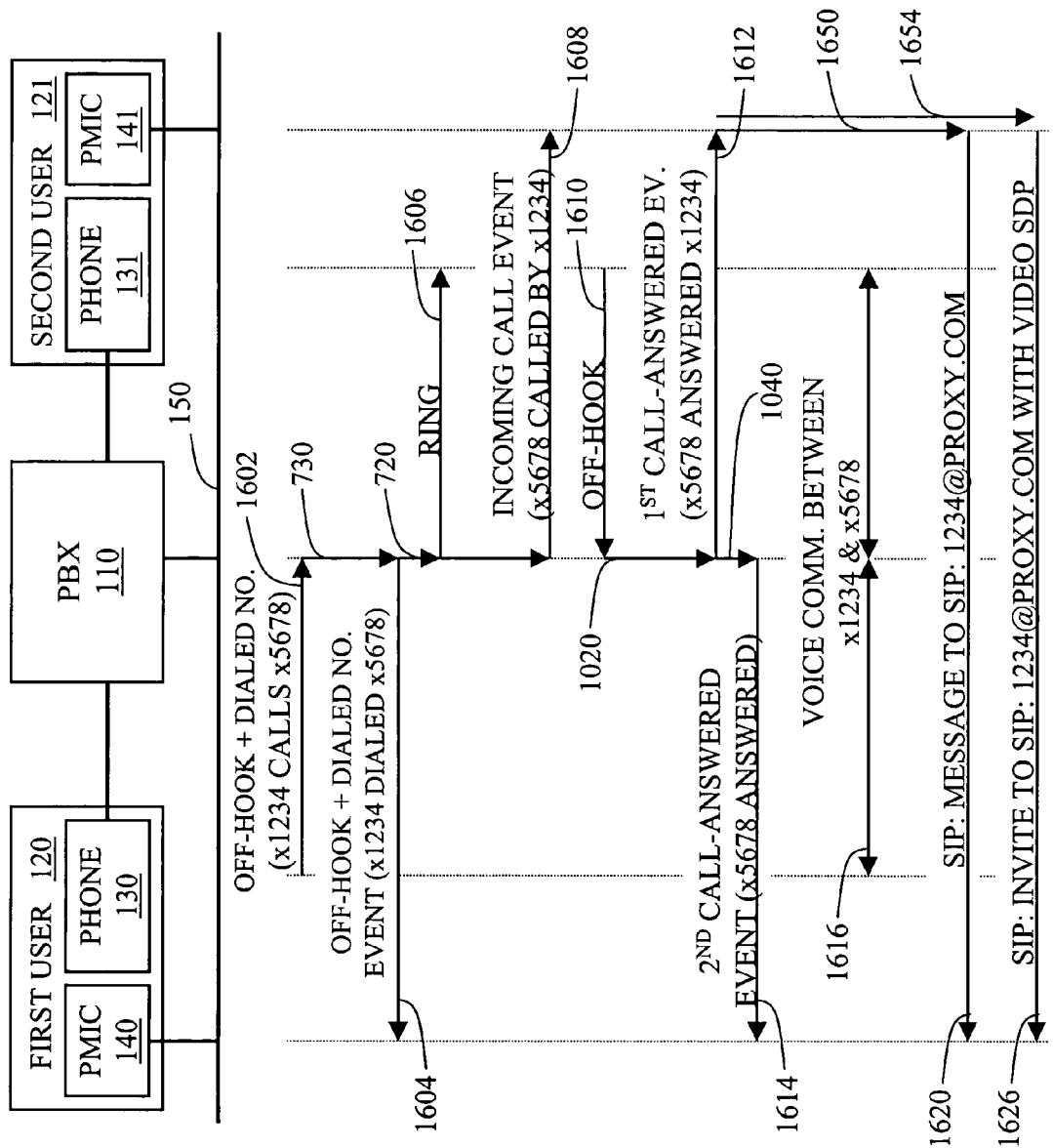
FIG. 16C is a flow diagram demonstrating a first procedure for establishing a third category of CMS between calling parties, according to the preferred embodiment.

Illustrated in FIG. 16C is a flow diagram demonstrating a third procedure for establishing a CMS between calling parties. Here, the various signals, CTI event messages, and SIP messages are replicated from FIG. 16A beginning with the off-hook plus dialed number signal 1602 through the SIP MESSAGE 1620. In this example, the first user 120 and second user 121 have desktop video cameras used by the CMS handler 434 of each user's PMIC 140, 141 to automatically setup (step 1654) a supplemental CMS such as video session 1626 with the primary CMS session 1620. The call recipient's CMS handler 434 automatically issues an additional SIP INVITE containing video session description protocol (SDP) information. In the preferred embodiment, the video session is a user-manageable setting, thereby allowing a call recipient to configure the CMS handler 434 to: (1) automatically enable and start the camera for every call, (2) fully disable the camera to prevent the camera from starting, (3) manual enable the camera to start at the discretion of the user, or (4) selectively enable the camera to start depending on the caller identification, i.e., caller ID.

As illustrated in more detail below, the integration of a CTI client capability into a PMIC permits the user to execute standard telephone set control functions from the individual's computer. In the preferred embodiment, the PMIC is adapted to transmit PBX call control commands including, but not limited to, make-call commands to initiate a call, answer-call commands to accept an incoming call, hold-call commands to temporarily pause an on-going call at the PBX, transfer-call commands to redirect a call between the PBX phone and user PMIC or other device, conference-call commands to establish a call with three or more parties, and forward-call commands to direct a call to a device specified by the user.

Figure 17:
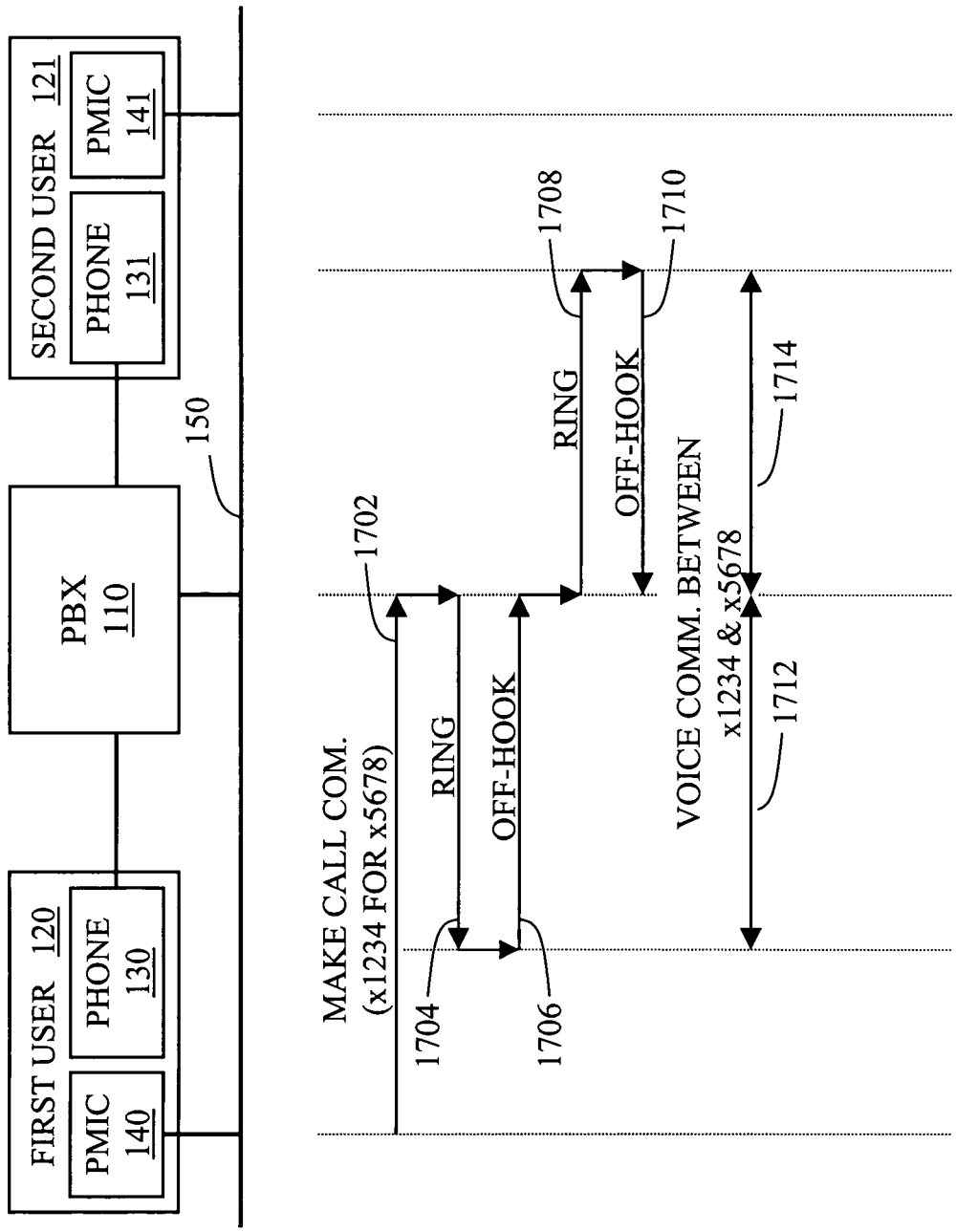
FIG. 17 is a flow diagram demonstrating a call initiated from the PMIC, according to the preferred embodiment.

Illustrated in FIG. 17 is a flow diagram demonstrating a PBX-supported call initiated from a PMIC. First, the user enters a destination telephone number into the user's PMIC GUI and activates a make-call routine in the PMIC controller. The PMIC issues a make-call command 1702 that causes the PBX 110 to issue a ring signal 1704 to the user's phone 130. After the handset is picked up and an off-hook signal 1706 transmitted, the PBX 110 places the call to the destination number corresponding to second user phone 131, for example, via a ring signal 1708. When the second user phone 131 is answered and an off-hook signal 1710 transmitted, the parties are enabled for telephonic voice communications 1712, 1714. In another embodiment, the caller's PBX phone 130 automatically enters a hands-free speakerphone mode and the recipient called immediately after the destination number is entered at the PMIC 140.

Figure 18A:
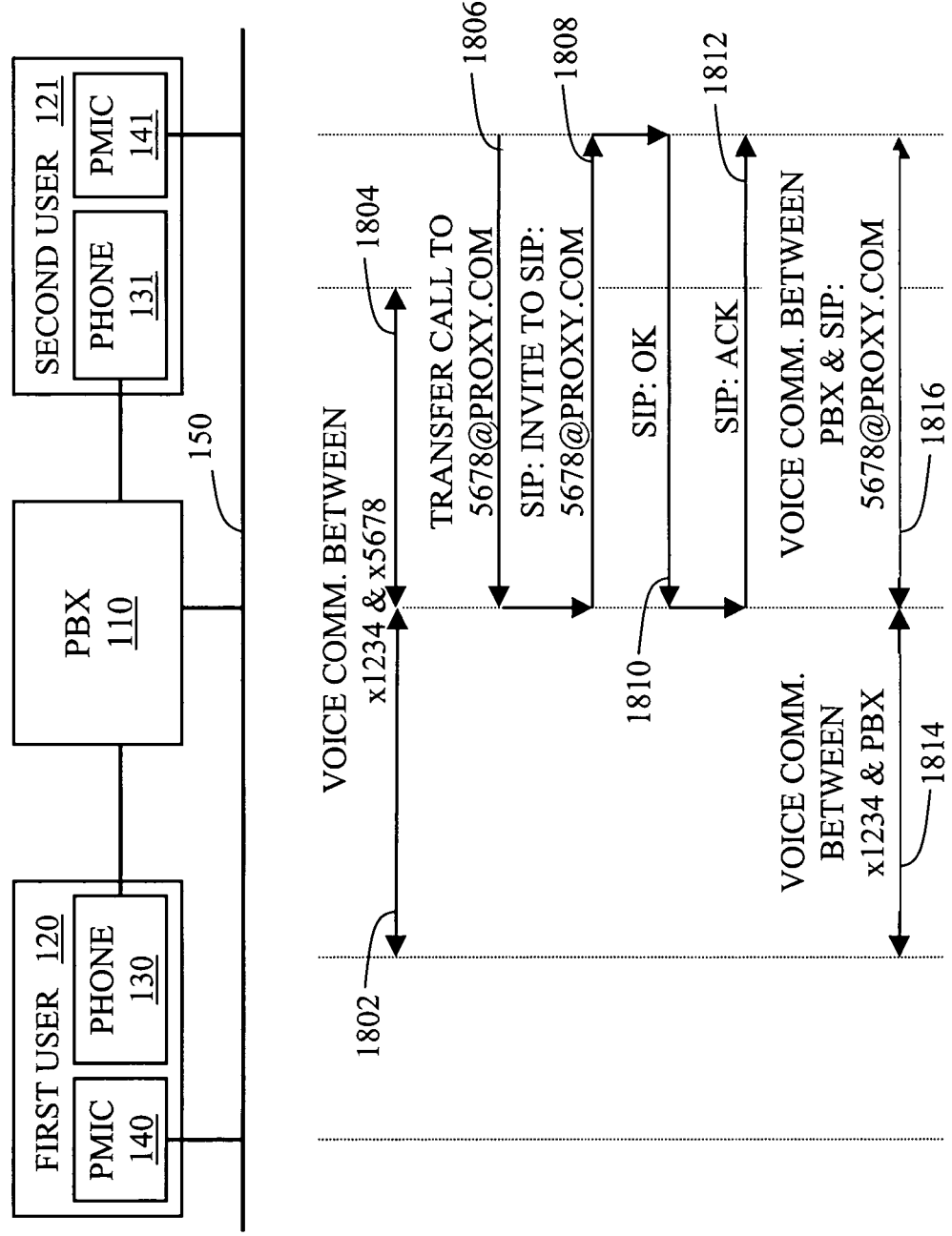
FIG. 18A is a flow diagram demonstrating an on-going telephone communication being transferred from a user PBX phone to an associated PMIC, according to the preferred embodiment.
Figure 18B:
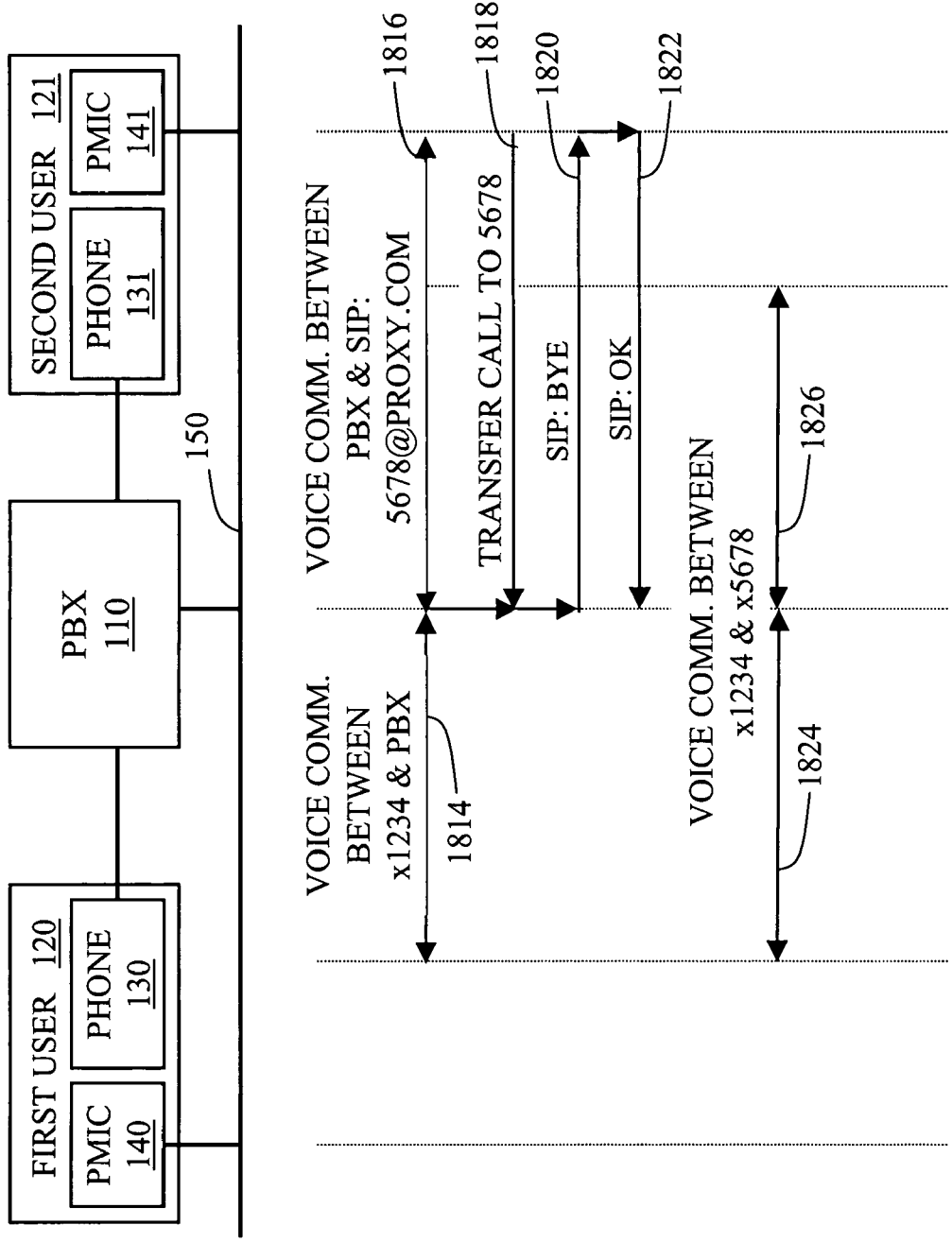
FIG. 18B is a flow diagram demonstrating an on-going telephone communication being transferred from PMIC to an associated PBX phone, according to the preferred embodiment.

Illustrated in FIG. 18A and FIG. 18B are flow diagrams demonstrating an on-going communications being transferred between a user PBX phone and the associated PMIC. In this embodiment, the PMIC is adapted to interoperate with a PBX 110 enabled with SIP or other VoIP protocol in addition to CTI client functionality. This PBX system, referred to as a SIP-PBX, has native SIP capabilities including the ability to make and receive SIP voice calls.

As illustrated in FIG. 18A, an enterprise worker may transfer an on-going call on the PBX phone to the user's PMIC. At any time during a telephonic voice conversation 1802, 1804 between the first user phone 130 and the second user phone 131, a user may transfer the call from his or her PMIC 141 by issuing a PMIC transfer command 1806, preferably a CTI message, comprising the identifier of the device to which to transfer the call. In the case of a PMIC 141 enabled with a SIP user agent, the transfer command 1806 may include the SIP URI used by the PBX 110 to execute a call transfer to the PMIC SIP voice client. When the SIP INVITE 1808 to 5678@proxy.com is accepted by the PMIC 141 by means of a SIP OK message 1810, the PBX 110 bridges the first leg of the conversation 1814 with the first user phone 130 in the PDSV domain with the second leg of the conversation 1816 with the second user PMIC 131 in the SIP domain. In the preferred embodiment, the SIP URI is derived from extension number of the user phone with which it is associated.

As illustrated in FIG. 18B, the second user 121 may at any time transfer the SIP domain call 1816 directed to the second user PMIC 141 back to the second user PBX phone 141 A PBX phone transfer command 1818, e.g. a CTI message, comprising the 110 second user's phone extension, number x5678, is issued by the second PMIC 141 to the PBX 110. Upon receipt, the PBX 110 terminates the SIP session with a SIP BYE message 1820 and enables the PDSV voice communication 1826 between the PBX 110 and the second user phone 131.

Figure 19:
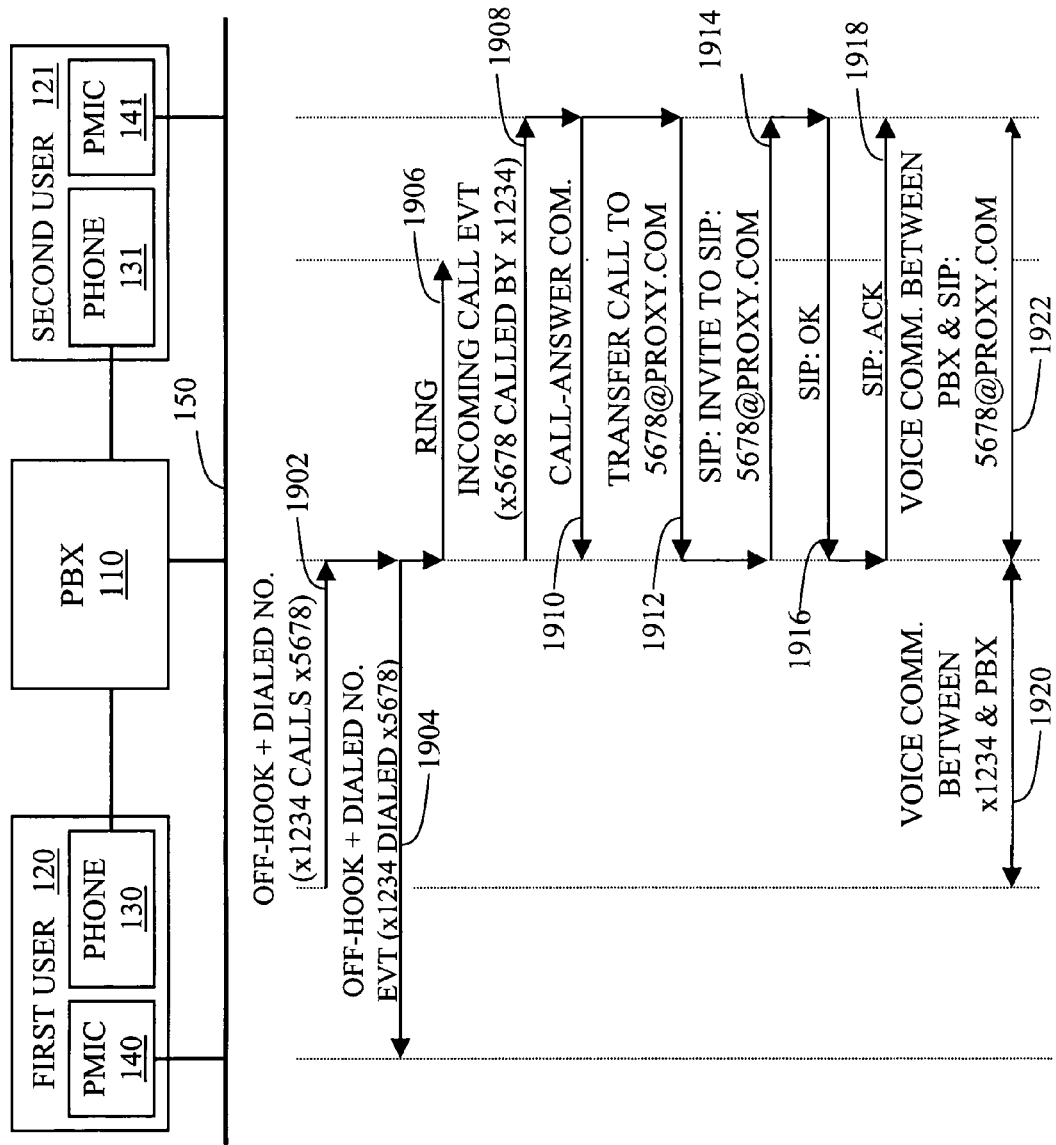
FIG. 19 is a flow diagram demonstrating a PMIC automatically answering an incoming call, according to the preferred embodiment.

As illustrated in FIG. 19, a PMIC may also be used to answer an incoming call destined to a PBX phone independently of the user's PBX phone. In response to an incoming call 1902, the PBX 110 in the preferred embodiment transmits a ring signal 1906 an incoming-call event 1908, e.g. a CTI message, to the call recipient's PMIC 141. The second user 121 may then click an answered button in the PMIC GUI causing it to issue an answer command 1910 and transfer command 1912. The transfer command 1912 comprises the identification of the device to which the call is to be forwarded. The identification of the PMIC 141 is the SIP URI, SIP:5678@proxy.com. In response, the PBX 110 issues a SIP INVITE message 1914, to which the PMIC 141 automatically responds with a SIP OK message 1916. The subsequent conversation between the caller 120 and recipient 121 includes PDSV domain voice 1920 between the caller 120 and SIP PBX 110, and SIP domain VoIP 1922 between the SIP PBX 110 and recipient's PMIC 141.

Figure 20A:
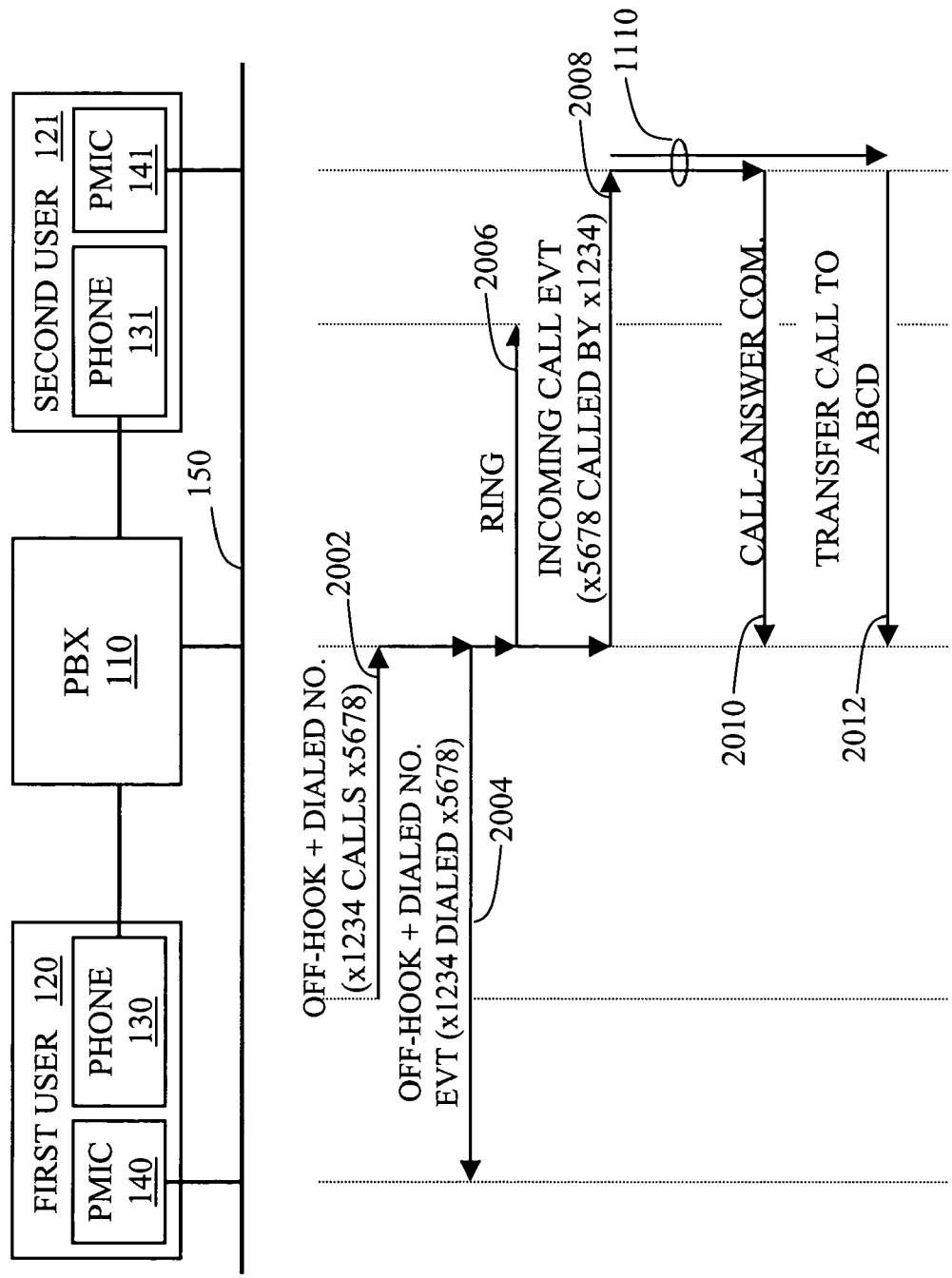
FIG. 20A is a flow diagram demonstrating an incoming call being automatically forwarded by a PMIC, according to the preferred embodiment.
Figure 20B:
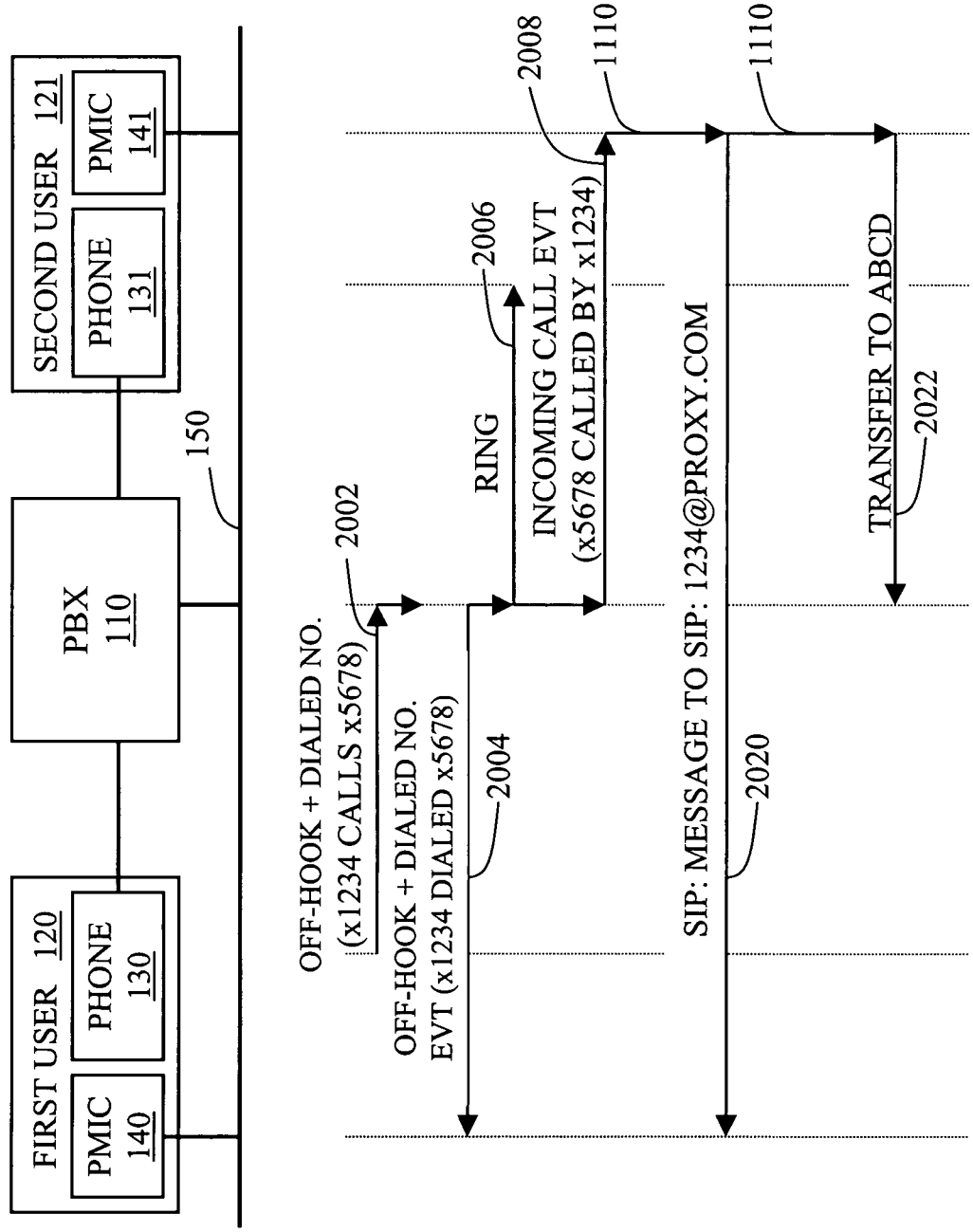
FIG. 20B is a flow diagram demonstrating a PMIC automatically responded to an incoming call with an instant message, according to the preferred embodiment.

Illustrated in FIG. 20A and FIG. 20B are flow diagrams demonstrating an incoming call to a PBX phone being automatically processes by an associated PMIC without user intervention. In FIG. 20A, the PMIC answers an incoming call to a user's PBX phone and then forwards the call to another device previously specified by the user. In response to an incoming call 2002, the PBX 110 in the preferred embodiment transmits ring signal 2006 to the second user phone 131 and an incoming-call event 2008 to the call recipient's PMIC 141. Upon receipt of the incoming-call event 2008, the second user PMIC 141 implements call routing processing (state 1110) that dictates how this call is to be treated. If the call routing logic 430 of FIG. 4B indicates that the call should be transferred to another device, the second user PMIC 141 issues an answer-call command 2010 preventing the PBX 110 from forwarding the call in accordance with its no-answer procedure, e.g. voice mail 206. The second user PMIC 141 also issues to the PBX 110 a call-transfer command 2012 identifying the destination device to which the call is to be forwarded, e.g., device ABCD. The destination device may be another PBX extension, a PSTN telephone, or a SIP user agent.

The call routing logic 430 in the preferred embodiment comprises user-managed preferences include forwarding criteria and the action to be taken when the forwarding criteria are satisfied. These criteria may include the phone number or extension of the calling party and the time-of-day and date, for example. The call routing logic 430 may dictate that (1) on Wednesday evenings the call should be answered and transferred to PBX phone extension number x6789, on (2) Thursday evenings the call should be answered and transferred to John@acme.com, and (3) at all other times, the call is not answered by the PMIC, thereby allowing the PBX 110 to automatically forward to call voicemail 206 if not answered.

The call routing logic 430 in some embodiments may also depend on the presence state of its user. For example, if a user's presence state is set to "away," determined either via manual operation or automatically in the absence of keyboard activity for a period of time, the call routing logic 430 may be configured to forward to an incoming call to the extension of an administrative assistance. Similarly, an incoming call might be directed to the SIP user agent of another enterprise colleague selected by the user, thereby providing an alternative point of contact while the user is unavailable or out of the office. In the preferred embodiment, the call routing logic 430 is in the form of a script created by the user, although it may also be configured via a graphical and or menu-based interface on the PMIC GUI 436.

The call routing logic 430 of a PMIC in some embodiments also includes the SIP text messaging and document transfer capabilities as part of the call treatment for incoming and outgoing calls at the PBX phone. Illustrated in FIG. 20B is a flow diagram demonstrating an instant message being transmitted by a PMIC in response to an incoming call. The PBX 110 responds to incoming call 2002 with ring signal 2006 and an incoming-call event 200,8 sent to the call recipient's PMIC 141. Upon receipt of the incoming-call event 2008, the second user PMIC 141 implements call routing processing 1110 that dictates how this call is to be treated. When configured accordingly, the second user's PMIC 141 transmits an instant message 2020 from the user's PMIC to the caller's PMIC 140. The caller's SIP URI, SIP: 1234@proxy.com, is derived from the caller's extension, number x1234, learned by the second user's PMIC 141 from the preceding incoming call event 2008.

The instant message may include a standardized greeting or a customized Instant Message including information specifically intended for the caller about. A person may, for example, generate a personal message including the anticipated return time or an alternate contact number. Similarly, the call routing logic 430 in some embodiments is adapted to transmit a document that may contain text, graphics, spreadsheet, or other information of interest to the caller in response to an incoming call directed to a specific PBX extension.

After the instant message 2020, the incoming call may further processed in any number of ways defined by the call routing logic 430. In this example, the second PMIC 141 causes the PBX 110 to transfer the incoming call to device ABCD using transfer command 2022.

In some embodiments, the caller's PMIC may also be configured to respond to the call recipient's instant message with another instant message sent to the call recipient's PMIC 141. For example, when the second user 121 receives a telephone call from extension number x1234, the call routing logic 432 generates the appropriate URI and sends an instant message to SIP:SecondUser@pda.com to inform the second user 121 that the first user phone 131, i.e., extension number x1234, had called. The call routing logic 430 may be tailored to inform a call recipient of the call and the time of the call.

The call routing logic 430 may also be configured to automatically send an instant message when an outbound call is placed from the PBX phone associated PMIC. A specific SIP emergency message, for example, may be sent to a pre-selected SIP user when the Emergency 911 number is dialed.

Figure 21:
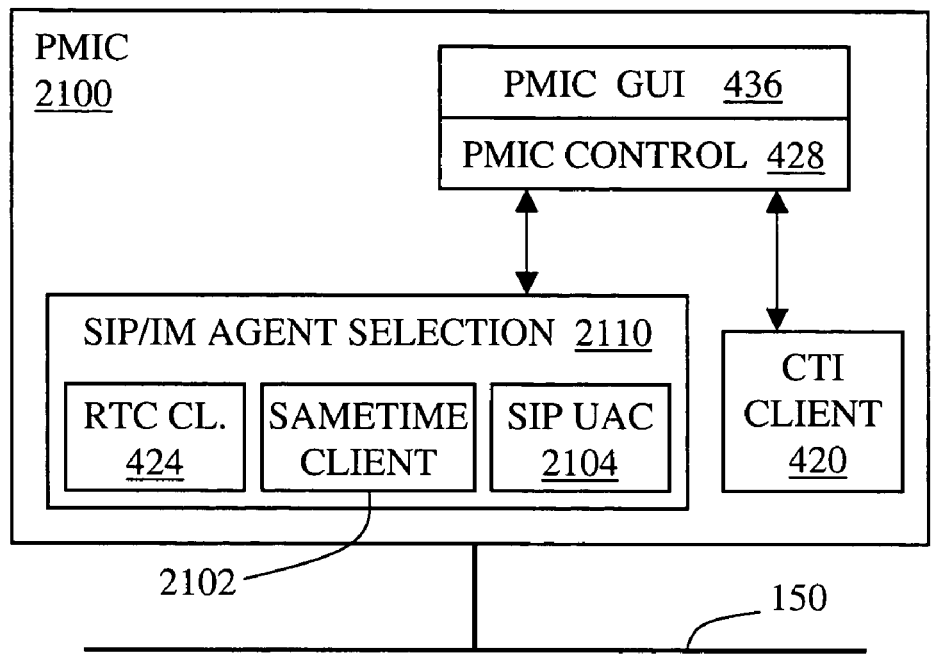
FIG. 21 is a functional block diagram of a PMIC with a plurality of selectable SIP user agents, according to the second preferred embodiment.

Illustrated in FIG. 21 is a functional block diagram of a user PMIC with a plurality of selectable SIP user agents. In addition to Microsoft's RTC SIP client 424 and a CTI client 420 discussed above, a PMIC 2100 may further include one or more additional SIP instant messaging applications such as a SAMETIME client 2102 by IBM Lotus Corp. and/or any other commercial SIP User Agent Client The user may select one of the plurality of SIP client via PMIC GUI 436, for example, by entering a user-selectable parameter causing the SIP/IM selection module 2110 to use the selected SIP client for subsequent IM exchanges. To aid in the selection, the various features supported by each individual SIP client may be indicated as present or not present, or selectable and non-selectable. As with other GUIs, the features that are not present in a particular client may be indicated by representing the feature in greyed-out text or icon form. To the degree that two or more SIP clients support common functionality, in the preferred embodiment the user experience is identical and independent of the SIP client selected.

Figure 22:
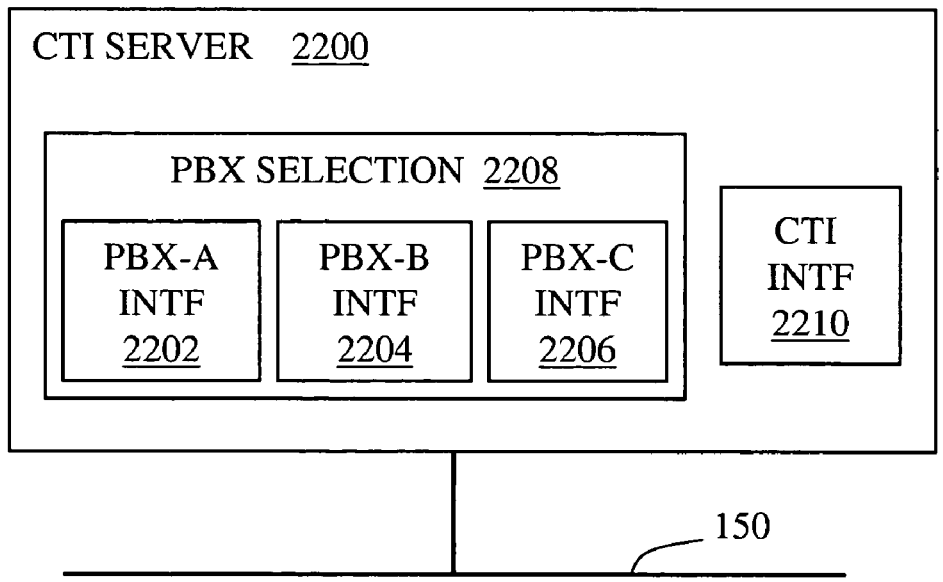
FIG. 22 is a CTI server with a plurality of PBX interfaces, according to the preferred embodiment.

Illustrated in FIG. 22 is a CTI server with which the present invention may be made to interoperate with one of a plurality of different types of PBX systems. The CTI server 2200 in this embodiment comprises a plurality of PBX interfaces from which the network administrator may choose. Using the PBX selection 2208, for example, the system administrator may configure the CTI server 2200 to use either PBX-A interface 2202, PBX-B interface 2204, or PBX-C interface 2206, depending on the hardware and vendor requirements of the PBX 110. CTI server 2200 capable of communicating with multiple types of PBXs using a single common CTI interface 2210 protocol to/from a CTI client are available from Genesys Telecommunications Laboratories, Inc. of San Fransisco, Calif., for example. In this manner, the PMIC is generally able to provide the functionality of the several embodiments in a manner independent of the type PBX system or vendor.

Although the description above contains many specifications, these should not be construed as limiting the scope of the invention but as merely providing illustrations of some of the presently preferred embodiments of this invention.

Therefore, the invention has been disclosed by way of example and not limitation, and reference should be made to the following claims to determine the scope of the present invention.

I claim:

1. A presence notification method, in a system comprising the steps of:
   receiving at a computer from a private branch exchange (PBX) a first message indicating an off-hook state of a first PBX phone attached to the computer and wherein the computer includes a PBX Messaging Integration Client (PMIC) capable of placing and answering PBX calls without a PBX phone, routing incoming calls directed to PBX extensions to other devices, forwarding calls away from PBX phones to other devices, and placing calls on hold, with the PMIC associated with an individual;
   consulting a subscriber table including an identity of one or more presence-state subscribers; and
   transmitting a second message to at least one of the one or more presence-state subscribers indicating the off-hook state of the first PBX phone.

2. The presence notification method of claim 1, wherein the computer is resident in an Internet Protocol (IP) network.

3. The presence notification method of claim 1, wherein the second message is a presence-state message.

4. The presence notification method of claim 3, wherein the presence-state message is a session initiation protocol (SIP) instant message.

5. The presence notification method of claim 1, wherein first message is a computer telephony integration (CTI) event message.

6. The presence notification method of claim 5, wherein the CTI event message is generated using a protocol selected from the group consisting of: Telephony Application Programming Interface (TAPI) protocol, Telephony Services Application Programming Interface (TSAPI) protocol, and the Computer Supported Telecommunications Applications (CSTA) protocol.

7. The presence notification method of claim 5, wherein the CTI event message is received indirectly via a CTI server.

8. The presence notification method of claim 1, wherein second message is an on-phone presence-state notification message.

9. The presence notification method of claim 1, wherein the method further comprises, prior to the receiving step, the step of transmitting to the PBX a registration event message comprising a network address for the computer interface.

10. The presence notification method of claim 1, wherein the method further includes the steps of: receiving from the PBX a third message indicating an on-hook state of the first PBX phone; and transmitting a fourth message to at least one of the one or more presence-state subscribers indicating the on-hook state of the first PBX phone.

11. A media session method for a first computer operatively coupled to a system comprising a private branch exchange (PBX) and a second computer comprising the steps of:
receiving a first message signifying that a second PBX phone attached to the second computer is calling a first PBX phone attached to the first computer;
transmitting a second message from the first computer to the second computer requesting a media session;
determining whether the media session request has been accepted; and
establishing a media session between the first computer and the second computer if the session request message has been accepted wherein each of the first computer and the second computer includes a PBX Messaging Integration Client (PMIC) capable of placing and answering PBX calls without a PBX phone, routing incoming calls directed to PBX extensions to other devices, forwarding calls away from PBX phones to other devices, and placing calls on hold.

12. The media session method of claim 11, wherein the first message comprises an extension number associated with a second PBX phone used by the first computer to generate the second message.

13. The media session method of claim 12, wherein the second message comprises a universal resource identifier with an extension number of the second PBX phone.

14. The media session method of claim 11, wherein the media session is a concurrent media session conducted in parallel with telephonic communication between the first PBX phone and the second PBX phone.

15. The media session method of claim 11, wherein the media session is selected from the group consisting of an instant message session, a text chat session, a multimedia session, a computer GUI interface sharing session, and a combination thereof.

16. The media session method of claim 11, wherein the media session is a SIP session.

17. The media session method of claim 11, wherein the media session is a text chat session.

18. The media session method of claim 17, wherein the users at the first computer and second computer may manually escalate from the text chat session to a second media session.

19. The media session method of claim 11, wherein the first message is a CTI event message.

20. The media session method of claim 11, wherein the step of determining whether the media session request has been accepted comprises the step of receiving an SIP OK message.

21. A call routing method for a system comprising the steps of:
receiving from a private branch exchange (PBX) a first message indicating an incoming call to a first PBX phone attached to a computer wherein the computer includes a PBX Messaging Integration Client (PMIC) capable of placing and answering PBX calls without a PBX phone, routing incoming calls directed to PBX extensions to other devices, forwarding calls away from PBX phones to other devices, and placing calls on hold with the PMIC associated with an individual;
determining from a call routing table maintained by the first computer an incoming call response to the incoming call; and
transmitting from the PMIC to the PBX a group of one or more messages based on the incoming call response.

22. The call routing method of claim 21, wherein the group of messages comprises a message answering the incoming call.

23. The call routing method of claim 21, wherein the group of messages comprises a message causing the PBX to discontinue a ring signal to the first PBX phone.

24. The call routing method of claim 21, wherein the group of messages comprises a message causing the PBX to transfer the incoming call to a second PBX phone.

25. The call routing method of claim 21, wherein the group of messages comprises a message causing the PBX to transfer the incoming call to the first computer.

26. The call routing method of claim 25, wherein the method further includes the step of establishing a voice-over-IP session between the PBX and the first computer.

27. The call routing method of claim 21, wherein the group of messages comprises a message causing the PBX to transfer the incoming call to a client.

28. The call routing method of claim 27, wherein the client is a SIP user agent operatively coupled to the system.

29. The call routing method of claim 21, wherein the group of messages comprises a message causing the PBX to terminate the incoming call and transmit an instant message.

30. The call routing method of claim 29, wherein the instant message is directed to a second computer identified based upon a phone number associated with the incoming call.

31. The call routing method of claim 21, wherein the call routing table comprises call processing rules structured as a function of the time and the day the incoming call is received, the telephone number or extension associated with the incoming call, and the presence-state of the user associated with the first PBX phone.

32. A call transfer method for a first computer operatively coupled to a system comprising the steps of:
transmitting to a private branch exchange (PBX) a first message for transferring a telephone call associated with a first PBX phone attached to the first computer wherein the first computer includes a PBX Messaging Integration Client (PMIC) capable of placing and answering PBX calls without a PBX phone, routing incoming calls directed to PBX extensions to other devices, forwarding calls away from PBX phones to other devices, and placing calls on hold, with the PMIC associated with an individual;
establishing a voice-over-IP session between the PBX and the first computer; and
replacing the telephone call to first PBX phone with a call to the first computer via the voice-over-IP session.

33. The call transfer method of claim 32, wherein the first message is a CTI event message.

34. The call transfer method of claim 32, wherein the first message comprises a universal resource identifier associated with the first computer.

35. The call transfer method of claim 32, wherein the step of establishing a voice-over-IP session comprises the steps of:
   receiving a voice-over-IP session request message from the PBX; and
   transmitting a voice-over-IP session acceptance message.

36. The call transfer method of claim 35, wherein the session request message is an SIP INVITE message and the session acceptance message is an SIP OK message.

37. A call transfer method for a first computer operatively coupled to a system comprising the steps of:
   transmitting to a private branch exchange (PBX) a first message for transferring a voice-over-IP session associated with the first computer and the PBX; and
   establishing a telephone call associated with a first PBX phone attached to the first computer; and
   terminating the voice-over-IP session between the PBX and the first computer which includes a PBX Messaging Integration Client (PMIC) capable of placing and answering PBX calls without a PBX phone, routing incoming calls directed to PBX extensions to other devices, forwarding calls away from PBX phones to other devices, and placing calls on hold, with the PMIC associated with an individual.

38. The call transfer method of claim 37, wherein the first message is a CTI event message.

39. The call transfer method of claim 37, wherein the first message comprises an extension number associated with the first PBX phone.

40. The call transfer method of claim 37, wherein the step of establishing the voice-over-IP session comprises the step of transmitting a private digital signals and voice (PDSV) signal to the first PBX phone.

41. A private branch exchange (PBX) call control method for a first computer operatively coupled to a system comprising the steps of:
   receiving from a private branch exchange (PBX) a first message indicating the presence of a telephone call associated with a first PBX phone attached to the first computer wherein the first computer includes a PBX Messaging Integration Client (PMIC) capable of placing and answering PBX calls without a PBX phone, routing incoming calls directed to PBX extensions to other devices, forwarding calls away from PBX phones to other devices, and placing calls on hold, with the PMIC associated with an individual; and
   transmitting with the PMIC to the PBX a call control message.

42. The PBX call control method of claim 41, wherein the first message is a CTI event message.

43. The PBX call control method of claim 41, wherein the first message is a call hold command instructing the PBX to place the telephone call associated with the first PBX phone on hold.

44. The PBX call control method of claim 41, wherein the first message is a call forward command instructing the PBX to transfer the telephone call associated with the first PBX phone to second phone.

45. The PBX call control method of claim 44, wherein the second phone is a second PBX phone.

46. The PBX call control method of claim 44, wherein the second phone is a voice-over-IP client.

47. The PBX call control method of claim 46, further comprising the steps of:
   transmitting to the PBX a first message for forwarding the telephone call associated with the first PBX phone to a voice-over-IP client;
   establishing a voice-over-IP session between the PBX and the voice-over-IP client; and
   directing the telephone call to first PBX phone to the first computer interface via the voice-over-IP session.

48. The PBX call control method of claim 41, wherein the call control message is an answer call command instructing the PBX to answer the telephone call using a second device.

49. The PBX call control method of claim 48, wherein the second device is a second PBX phone.

50. A private branch exchange (PBX) call control method for a first computer operatively coupled to a system comprising the steps of:
   transmitting to a private branch exchange (PBX) a group of one or more messages comprising:
      a command to the PBX to make a call to a first PBX phone connected to the first computer wherein the first computer includes a PBX Messaging Integration Client (PMIC) capable of placing and answering PBX calls without a PBX phone, routing incoming calls directed to PBX extensions to other devices, forwarding calls away from PBX phones to other devices, and placing calls on hold, with the PMIC associated with an individual, and
      a telephone number of the first PBX phone; and
   receiving a first message indicating the hook state of the first PBX phone.

* * * * *